United States Patent
Chandler et al.

(10) Patent No.: US 11,870,225 B2
(45) Date of Patent: Jan. 9, 2024

(54) SHEATHED CABLE STRIPPER AND METHODS FOR USING SAME

(71) Applicant: STRIPEEZ, LLC, Salem, NH (US)

(72) Inventors: Robert Chandler, Salem, NH (US); Joseph Gordon, Salem, NH (US)

(73) Assignee: STRIPEEZ, LLC, Salem, NH (US)

( * ) Notice: Subject to any disclaimer, the term of this patent is extended or adjusted under 35 U.S.C. 154(b) by 1118 days.

(21) Appl. No.: 16/529,778

(22) Filed: Aug. 1, 2019

(65) Prior Publication Data
US 2020/0044423 A1 Feb. 6, 2020

Related U.S. Application Data

(60) Provisional application No. 62/713,422, filed on Aug. 1, 2018.

(51) Int. Cl.
*H02G 1/12* (2006.01)

(52) U.S. Cl.
CPC ......... *H02G 1/1214* (2013.01); *H02G 1/1236* (2013.01)

(58) Field of Classification Search
CPC ...... H02G 1/12; H02G 1/1204; H02G 1/1214; H02G 1/1217; H02G 1/1236
USPC .......................... 30/90.4–91.1; 81/9.43, 9.44
See application file for complete search history.

(56) References Cited

U.S. PATENT DOCUMENTS

| | | | | | |
|---|---|---|---|---|---|
| 2,089,774 | A | * | 8/1937 | Wachstein | H02G 1/1295 30/91.1 |
| 2,120,398 | A | * | 6/1938 | Edwards et al. | H02G 1/1229 30/90.6 |
| 2,141,002 | A | * | 12/1938 | Huff | H02G 1/1231 30/91.1 |
| 2,275,867 | A | * | 3/1942 | Rybolt | H02G 1/1217 30/91.1 |
| 2,385,368 | A | * | 9/1945 | Montgomery | H02G 1/1229 30/90.9 |
| 2,761,211 | A | * | 9/1956 | Grant | H02G 1/1217 30/90.8 |
| 2,819,520 | A | * | 1/1958 | Eyles | H02G 1/1217 30/90.8 |
| 2,955,494 | A | * | 10/1960 | Shader et al. | H02G 1/1214 30/91.2 |
| 2,995,052 | A | * | 8/1961 | Funcik | H02G 1/1214 30/90.1 |

(Continued)

FOREIGN PATENT DOCUMENTS

| | | |
|---|---|---|
| CA | 2616773 A1 | 3/2000 |
| CN | 202363820 U | 8/2012 |

*Primary Examiner* — Jason Daniel Prone
(74) *Attorney, Agent, or Firm* — BEKIARES ELIEZER LLP

(57) ABSTRACT

Disclosed herein is a sheathed cable stripping device and method for using same. A method for stripping and cutting non-metallic sheathed cable (NMSC) using a sheathed cable stripper, the method includes receiving a non-metallic sheathed cable in a wire channel of the sheathed cable stripper; sliding the non-metallic sheathed cable along the wire channel; cutting and removing the sheathing of the non-metallic sheathed cable by pulling the sheathed cable stripper toward the user. In yet other aspects, the sheathed cable stripper reduces time and labor costs associated with wiring while providing a safer, more effective, and efficient manner for cutting and removing sheathing from non-metallic sheathed cable.

20 Claims, 17 Drawing Sheets

(56) References Cited

U.S. PATENT DOCUMENTS

| | | | | |
|---|---|---|---|---|
| 3,091,031 A * | 5/1963 | Grant | H02G 1/1231 | 30/90.7 |
| 3,238,618 A * | 3/1966 | Cook, Jr. | H02G 1/1217 | 30/287 |
| 3,462,052 A * | 8/1969 | Wagner | H02G 1/1239 | 30/90.4 |
| 3,530,575 A * | 9/1970 | Riche | H02G 1/1214 | 30/91.2 |
| 3,623,384 A * | 11/1971 | Murphy | H02G 1/1229 | 30/90.6 |
| 3,703,035 A * | 11/1972 | Handy | H02G 1/1217 | 30/90.9 |
| 4,459,745 A * | 7/1984 | Britton | H02G 1/1217 | 30/90.4 |
| 4,594,921 A * | 6/1986 | Ishmael | H02G 1/1275 | 81/9.44 |
| 4,656,893 A * | 4/1987 | Hudson | H02G 1/126 | 30/90.4 |
| 4,738,027 A * | 4/1988 | Bermier, Jr. | H01B 7/0823 | 30/90.6 |
| 4,947,549 A * | 8/1990 | Genovese | H02G 1/1217 | 30/90.8 |
| 5,050,302 A * | 9/1991 | Mills | H02G 1/1217 | 30/90.4 |
| 5,093,992 A * | 3/1992 | Temple, Jr. | G02B 6/4497 | 30/90.4 |
| 5,337,479 A | 8/1994 | Ducret | | |
| 5,443,536 A * | 8/1995 | Kiritsy | G02B 6/4495 | 30/90.8 |
| 5,561,903 A * | 10/1996 | Bourbeau | H02G 1/1217 | 30/90.4 |
| 5,577,150 A * | 11/1996 | Holder | G02B 6/4497 | 30/90.4 |
| 5,822,863 A * | 10/1998 | Ott | G02B 6/4497 | 30/90.9 |
| 5,887,346 A * | 3/1999 | McCasland | B26F 1/0023 | 30/90.1 |
| 6,018,873 A * | 2/2000 | McClellan | H01B 15/006 | 30/90.1 |
| 6,023,844 A * | 2/2000 | Hinson, II | G02B 6/4497 | 30/90.4 |
| 6,192,588 B1 * | 2/2001 | Krampe | H02G 1/1214 | 30/90.6 |
| 6,401,339 B1 * | 6/2002 | Schmidt | B26B 27/00 | 30/90.4 |
| 7,360,472 B2 | 4/2008 | Krampe et al. | | |
| 2007/0234858 A1 | 10/2007 | Sullivan et al. | | |
| 2017/0110860 A1 | 4/2017 | Repton | | |

* cited by examiner

SHEATHED CABLE STRIPPER AND METHODS FOR USING SAME

CROSS REFERENCE TO RELATED APPLICATIONS

This application claims the benefit of priority to U.S. Provisional Application No. 62/713,422, filed Aug. 1, 2018, which is herein incorporated in its entirety. It is intended that the referenced application may be applicable to the concepts and embodiments disclosed herein, even if such concepts and embodiments are disclosed in the referenced applications with different limitations and configurations and described using different examples and terminology.

FIELD OF DISCLOSURE

The present disclosure relates to devices, apparatuses and methods specially adapted for installing, maintaining, repairing, or dismantling electric cables, wires, or lines. Moreover, the present disclosure relates to multi-purpose hand tools, hand-held tools, or combination thereof specially adapted for installing, maintaining, assembling, repairing, or dismantling wire, wire connectors, wiring and the like.

BACKGROUND OF THE DISCLOSURE

Precision tools are a necessity in the electrical industry. Having the proper tools to assist the electrician with installing cabling, laying out wiring systems, and maintaining the integrity and safety of the electric cabling is essential to performing a quality job. In addition, not having the proper tools or the use of tools with non-uniform performance may be considered a work and safety hazard. Moreover, errors made when wiring electric cables inside of residences and commercial buildings cause major inconveniences and problems such as risks of electrical fires, faulty wiring, short circuits, and expensive costly electrical repairs. The costly electrical repairs may also cause extensive damage to the interior of the residence and require additional expensive rehabilitation of the structure, interior walls, painting and finishing.

In some situations, stripping cable in electrical wiring systems is a complex process further hampered by not having the most effective equipment. For example, using certain existing tools, one would be required to cut first then strip sheathing afterwards. Thus, the conventional strategy requires multiple steps performed repeatedly. Additionally, existing methods are quite imprecise and aggressive. This often causes problems because the conventional strategy does not protect underlying conductive material. For example, the cutting and stripping of sheathing frequently damages the underlying conductors.

Accordingly, there remains a need for an improved cable wire stripper and method for stripping sheathed cable. This need and other needs are satisfied by the various aspects of the present disclosure.

SUMMARY OF THE DISCLOSURE

In accordance with the purposes of the disclosure, as embodied and broadly described herein, the disclosure, in one aspect, relates to a sheathed cable stripper device and apparatus, such as for non-metallic sheathed cable (NMSC) wire. In further aspects, a non-metallic sheathed cable (NMSC) wire stripper device and apparatus and method for using the disclosed stripper devices are provided.

In another exemplary aspect, the disclosure relates to a sheathed cable stripper device and apparatus and method configured to strip the sheathing on 14/2, 12/2, and 14/3, i.e. flat, non-metallic sheathed cable. In another aspect, the sheathed cable stripper device and apparatus and method may be configured specifically for Romex™ cables.

In further aspects, the disclosure also relates to a sheathed cable stripper device and apparatus for residential and commercial wiring systems.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate several aspects of the disclosure and together with the description, serve to explain the principles of the disclosure.

DETAILED DESCRIPTION OF THE DISCLOSURE

Figure 1:
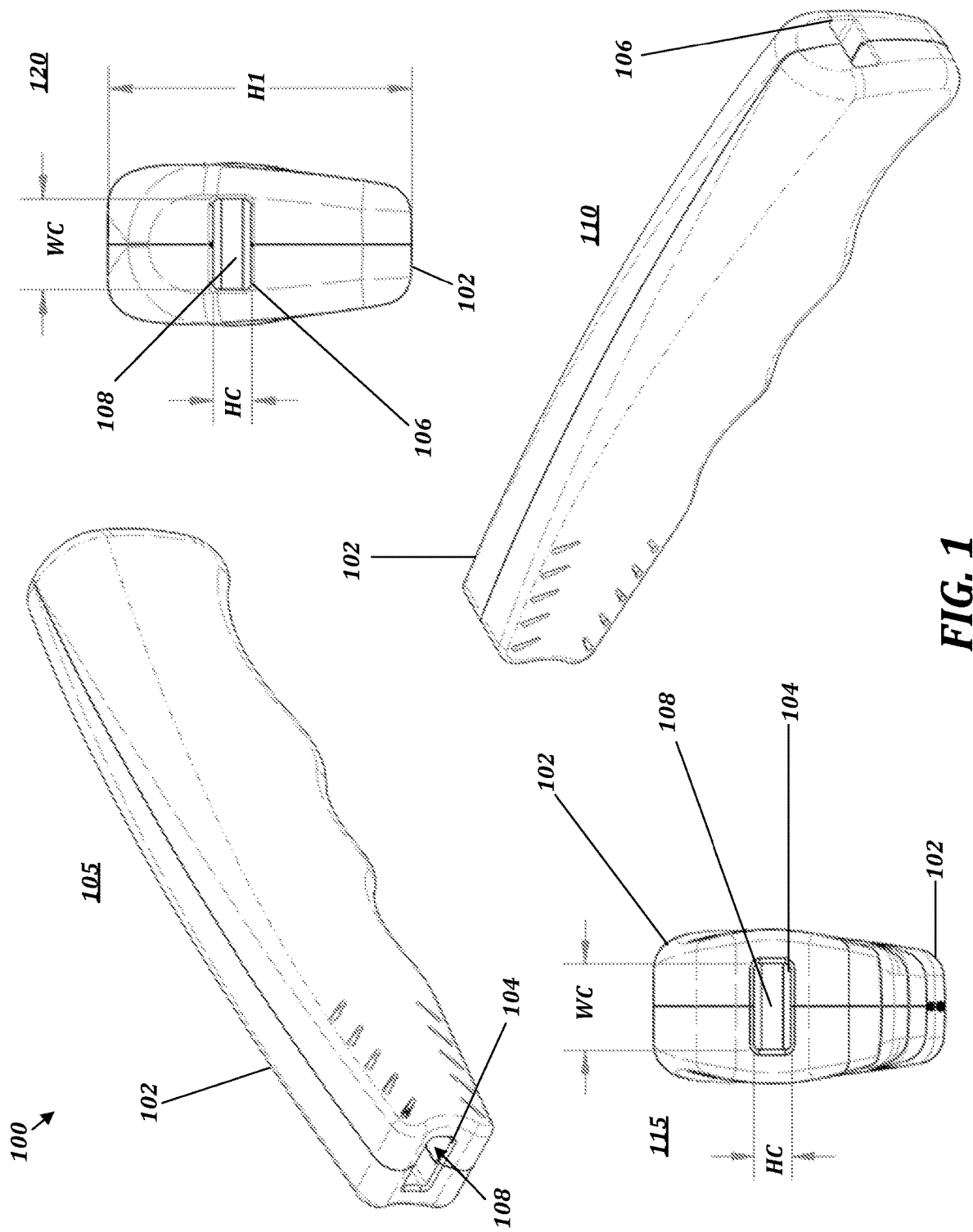
FIG. 1 shows various views of a sheathed cable stripper in accordance with an exemplary embodiment of the present disclosure.

The present disclosure can be understood more readily by reference to the following detailed description of the disclosure and the Examples included therein.

Before the present articles, systems, devices, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

All publications mentioned herein are incorporated herein by reference to disclose and describe the methods and/or materials in connection with which the publications are cited.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims, which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed devices, systems, and articles of the disclosure as well as the devices themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and devices of the disclosure. Thus, if there are a variety of additional steps that can be performed it is understood that each of these additional steps can be performed with any specific aspect or combination of aspects of the methods of the disclosure.

It is understood that the devices, apparatuses, and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Sheathed Cable Stripper Devices and Systems

As briefly described above, the present disclosure relates, in various aspects, to a sheathed cable stripper device and apparatus (which may individually also be referred to as a "sheathed cable stripping device" or "sheathed cable stripping apparatus", or collectively referred to as "sheathed cable stripper"), and methods for using the disclosed cable stripper devices and apparatuses for stripping non-metallic sheathed cable (NMSC). In another aspect, the sheathed cable stripper may be configured to strip the sheathing on 14/2, 12/2, and 14/3, i.e. flat, non-metallic sheathed cable. In another aspect, the sheathed cable stripper device, apparatus and method may be configured specifically for Romex™ cables. In one aspect, the present disclosure provides a non-metallic sheathed cable (NMSC) wire stripper having a housing having two opposed apertures or openings at the front and rear. In further aspects, the housing may be molded such that the base or bottom of the housing is shaped with curves configured to be hand held. In still further aspects, the two openings at the front and rear of the housing are entry or exit points of a wire channel running the central length of the housing. In even further aspects, the housing may comprise through holes, which may be associated with a cantilever arm for holding a blade, at the head end of the housing.

In an exemplary aspect, the present disclosure provides a cable stripper device for stripping sheathed cable, the device comprising: a housing having a first aperture at a first end of the housing, a second aperture at an opposed second end of the house, and a channel between the first and second ends, the channel configured to allow a sheathed cable to travel therethrough; at least one blade contained in a blade pocket within the housing, each blade defined by a cutting edge configured to cut or incise at least a portion of a sheath of the sheathed cable; and at least one tension element in operable communication with the at least one blade, each tension element configured to exert a force effective to maintain a blade in a first blade position wherein a portion of the blade is disposed within the channel.

In further aspects, the sheathed cable stripper may be configured to such that the housing may be separated into two halves. In still further aspects, each half may contain the hardware for stripping the sheathing, as well as, the hardware which allows the cable to pass through the channel. In still further aspects, the hardware may comprise one or more of the following: a spring arm or cantilever arm, blades, blade pockets, and a wire channel. In another aspect, the blades may be configured at a predetermined or specific angle effective to strip the wire. In even further aspects, the sheathed cable stripper may be configured such that wire sheathing may be cut and the sheathing may be removed and in a single fluid motion.

According to various aspects of the present disclosure, a cable stripper of the present invention comprises a housing, which may be shaped to conform to the contour of a surface, such as, for example, a hand. In further aspects, the shaped housing may have an established shape, for example, by a preformed casing, or may be a moldable casing that is shaped by a user. The housing may contain one or more components or elements described herein associated with the casing.

In further aspects, a housing may be flat or concave in shape on at least its proximal side so that the application area is shaped so that substantially all of the proximal side of the housing contacts the surface of the user's hand. All or a portion of a housing may be curved. For example, the entire housing may be curved, such as in a concave direction (curved like the interior of a circle). In further aspects, the proximal side of the housing may comprise a plurality of curves, and the distal side of the housing is also curved so as to be comfortably held by a hand. Alternatively, only one surface, either the distal or proximal side may be curved, for example, where the proximal side is flat, but the distal side is curved or has multiple curves. Additionally, a proximal side and/or a distal side of the casing may be flat or planar, and the lateral sides of the casing may be shaped. In still further aspects, the lateral sides of the housing may be shaped in any form desired. The housing can be any shape, and preferably is in the shape of a three-dimensional polygon and the housing walls define an interior space or interior sections for containing the operating elements of the invention. Any other shape (as used herein, the term shape is used in the broad sense of three-dimensional works) may be employed, so long as the shape is large enough and structured so as to be able to contain the various working components of the invention as more fully disclosed below.

In further aspects, the housing is a generally hollow structure sized to contain the blades in a blade packet and sheathed cable inserted through a wire channel. The housing can be a rigid hollow container having an interior volume or a flexible or pliant container having an interior volume. Such housing and containers are known, as well as their materials and methods of construction are within the skill of those in the art. The housing may be constructed such that housing can contain and hold the blades in a predetermined position relative to the sheathed cable when the sheathed cable is pulled through the channel of the housing. In still further aspects, the housing may comprise a plastic housing for the sheathed cable stripper. The plastic housing may be molded into a handle allowing for ease of gripping the sheathed cable stripper. In another aspect, the present disclosure provides for sheathed cable stripper comprising metal blades configured to cut sheathing. In another aspect, the present disclosure provides a plastic housing for the sheathed cable stripper such that the plastic housing houses the blades. In further aspects, the housing may comprise a blade pocket for containing the blades. The blade pocket may comprise a slot, fold or other type of compartment in the housing into which a blade or cutting element can be placed. As detailed herein, the blade pocket is accessed on the top and bottom sides of the channel via a mouth or an opening in the channel. Alternatively, the blade pocket can be located at other sites on the housing depending on the size and shape of housing and the location of the blade and tension elements within the housing.

In further aspects, the housing may further comprise a gripping area comprising an anti-slip material, for example, high friction rubber, on a portion or substantially all of the outer surface of the housing. In an aspect, a gripping area may be found on the proximal or bottom side of the housing and may cover a portion or substantially all of an area on the proximal side that corresponds to the user's finger positions. In yet further aspects, housing may comprise a gripping area on a portion or substantially all of the distal (i.e., top) and lateral (i.e., side) sides of the housing. In some embodiments, the sheathed cable stripper may be constructed with an ergonomic grip.

In further aspects, the blades may be positioned within the sheathed cable stripper such that when NMSCs are inserted into the housing channel, the blades give slightly. Subsequently, the blades remain rigid upon extraction which allow the metal blades to effectively and efficiently cut and remove the sheathing in one fluid motion. As described herein, the blades may be positioned or configured to have a predetermined angle and/or depth (e.g., depth with the channel) effective to consistently provide for effective and efficient cutting and removing of the sheathing. Additionally, the width of the housing channel and the internal wire channel are configured such to provide controlled movement of the cable in a manner that allows for safe passing through of the cable in the sheathed cable stripper along with consistently providing for effective and efficient cutting and removing of the sheathing by the blades. In still further aspects, the surface of the channel (i.e., the surface contacting the sheathed cable) may comprise a coating to prevent drag and facilitate the sliding of the sheath cable along the channel. The coating may comprise any desired coating effective to facilitate sheathed cable travel along the channel without damaging the sheathed cable.

In further aspects, the angle, position, and pressure applied to the sheathed cable stripper allows the sheathed cable stripper to be adapted from safely passing the wire through the apparatus and providing for effective and efficient cutting and removing of the sheathing by the blades housed in the sheathed cable stripper.

In further aspects, the blade housed in the housing of the sheathed cable stripper may be configured to have various thicknesses, angles, and depths. The blade housed in the housing of the sheathed cable stripper may be constructed from various materials including but not limited to stainless steel, aluminum, hardened steel, iron, and the like. In further aspects, the housing of the sheathed cable stripper may be constructed from various materials including but not limited to plastic, wood, polypropylene, abs, pvc, centered nylon, injection molded plastic, and the like. The housing of the sheathed cable stripper may be configured further comprising a rubber comfort grip.

In various aspects, the sheathed cable stripper may comprise a V-groove for stripping conductors, a wire nut tightener on the tail end, and a loop on the tail end. Moreover, the cap of the sheathed cable stripper may be constructed from various materials including but not limited to steel with a Rockwell hardness of 32"-56". The blades of the sheathed cable stripper may be constructed at an angle consistent with the design of the housing having the proper depth and proper beveled end. The housing channel of the sheathed cable stripper may be slightly larger than the outer diameter of the 12/2 non-metallic sheathed cable. The cantilever arms within the housing should be properly angled to provide the proper spring tension for the blades.

According to various further aspects of the disclosure, the sheathed cable stripper can comprise multiple configurations. For example, various exemplary embodiments of the inventive cable stripper devices and methods are shown in FIGS. 1-10C.

In aspects, FIGS. 1-5 and 9A-9B show various aspects and features of cable stripper devices 100 in accordance with the present disclosure.

Figure 2:
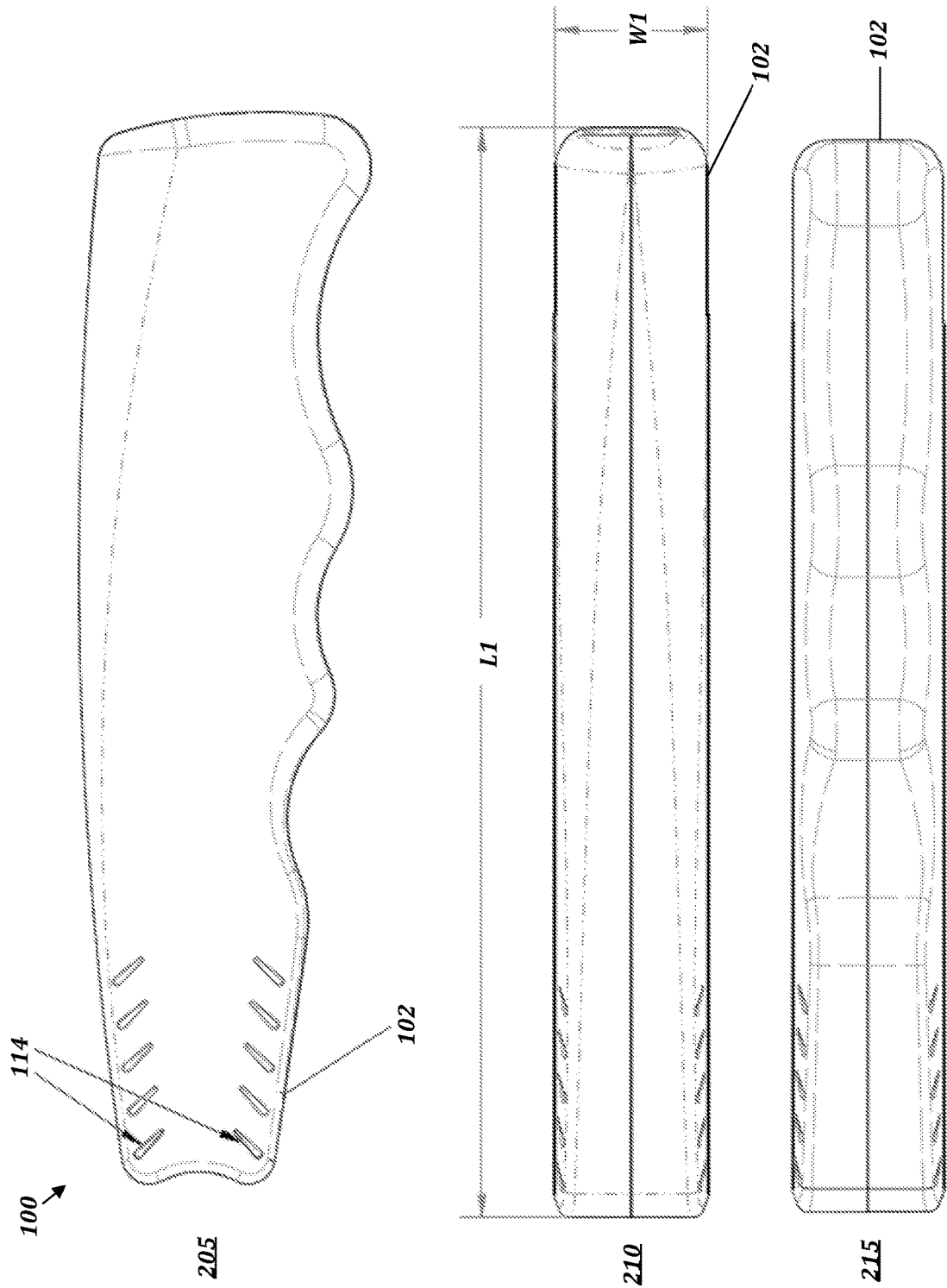
FIG. 2 shows various views of a sheathed cable stripper in accordance with an exemplary embodiment of the present disclosure.

FIG. 1 shows orthographic views of the sheathed cable stripper 100 in accordance with an exemplary embodiment of the present disclosure. More specifically, FIG. 1, 105 shows the right isometric view of the sheathed cable stripper. FIG. 1, 110 shows the left isometric view of the sheathed cable stripper. FIG. 1, 115 shows the front view of the sheathed cable stripper. FIG. 1, 120 shows the rear view of the sheathed cable stripper. FIG. 2 shows various views of a housing 102 of sheathed cable stripper 100 in accordance with an exemplary embodiment of the present disclosure. More specifically, FIG. 2, 205 shows the side view of the sheathed cable stripper. FIG. 2, 210 shows the top view of the sheathed cable stripper. The top surface has a smooth surface while the bottom surface is ergonomically configured with one or more curves to provide the ease of a hand-held grip. FIG. 2, 215 shows the bottom or base view of the sheathed cable stripper. FIG. 2, 210 gives exemplary dimensions of the sheathed cable stripper consistent with the present disclosure.

Cable stripper 100 may include housing 102 having a first aperture 104 at a first end of the housing, a second aperture 106 at an opposed second end of the house, and a wire channel 108 between the first and second ends, the wire channel configured to allow a sheathed cable to travel therethrough. Housing 102 may include a plurality of blade pockets 114 (Through hole to blade pocket shown) within the housing, each blade pocket containing a blade 112 configured to cut or incise at least a portion of a sheath of the sheathed cable. Housing 102 can have a length L1 from about 2.0 inches to about 24 inches, such from about 3.0 inches to about 12 inches, or from about 4.0 inches to about 6.2 inches, including exemplary values of 3.5, 4.0, 4.5, 5.0, 5.5 and 6.0 inches. Housing 102 can have a width W1 from about 0.2 inches to about 2.0 inches, for example, from about 0.3 inches to about 1.5 inches or from about 0.4 inches to about 1.0 inches, including exemplary values of 0.3, 0.4, 0.5, 0.6, 0.7, 0.8, 0.9, 1.0, 1.1, 1.2, 1.3, and 1.4 inches. Housing can have a height H1 from about 0.2 inches to about 3.0 inches, for example, from about 0.5 inches to about 2.0 inches or from about 0.4 inches to about 1.5 inches, including exemplary values of 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, and 2.9 inches.

Figure 3:
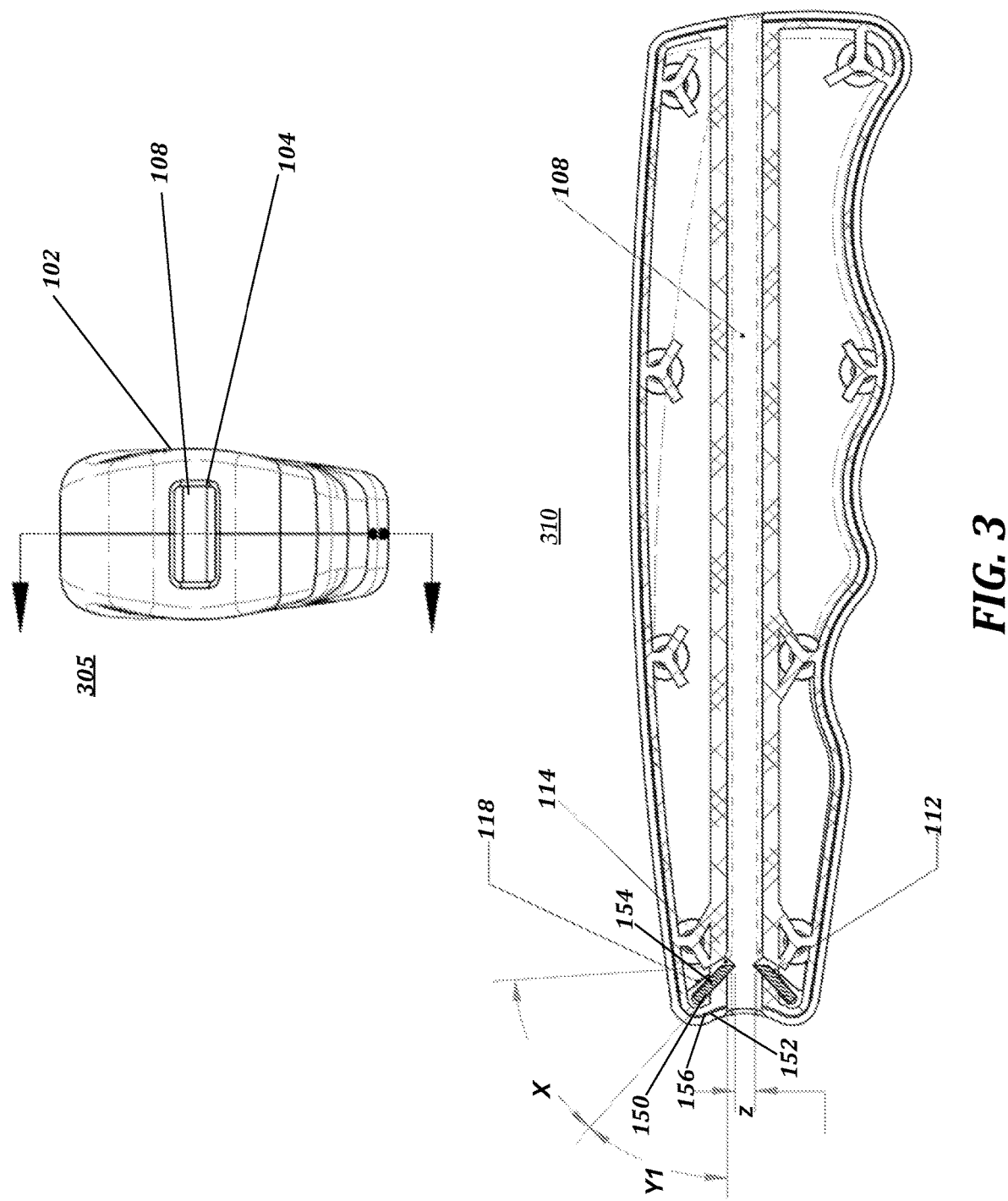
FIG. 3 shows a sectional view of a sheathed cable stripper in accordance with an exemplary embodiment of the present disclosure.
Figure 4:
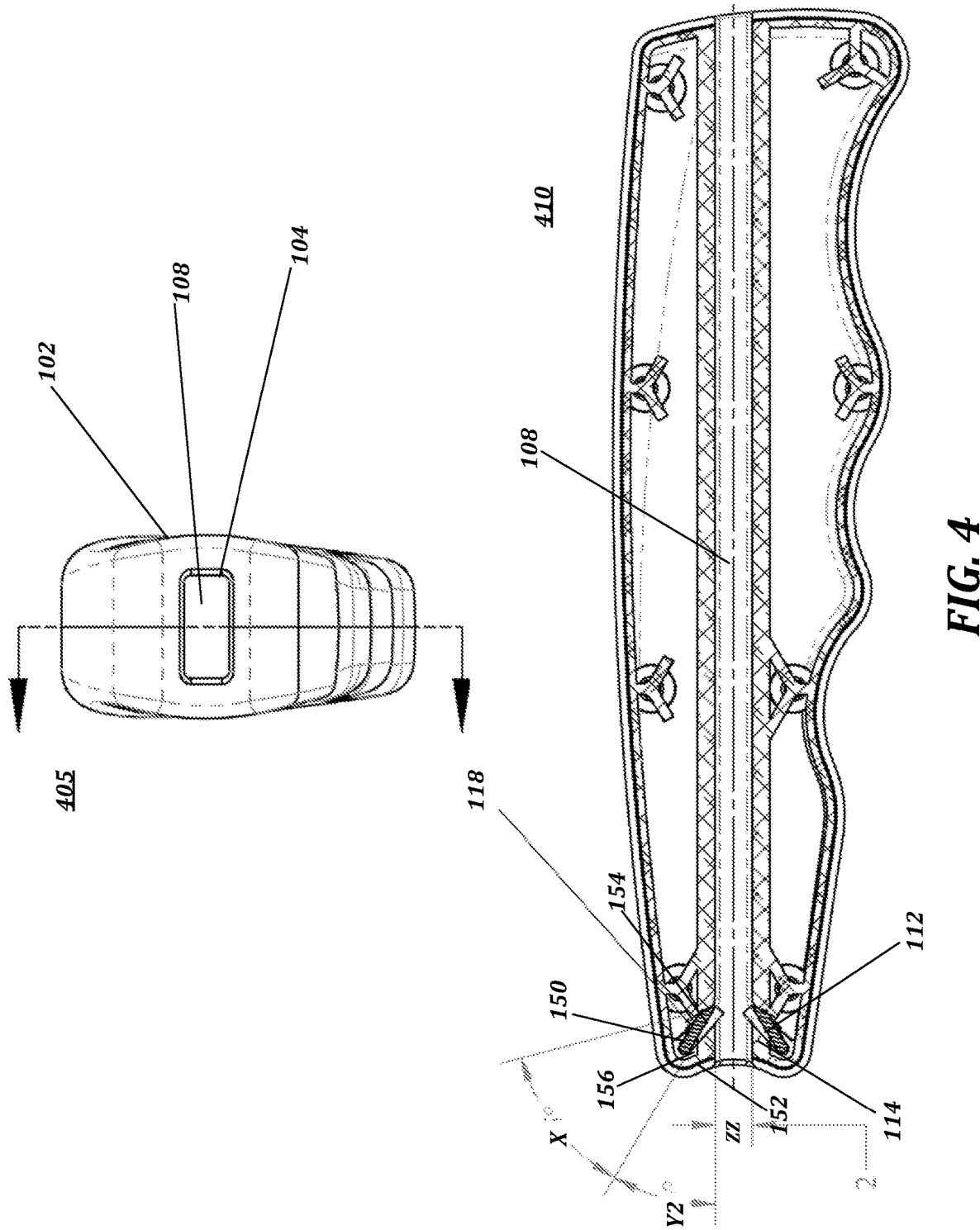
FIG. 4 shows a sectional view of a sheathed cable stripper in accordance with an exemplary embodiment of the present disclosure.

As shown in FIGS. 3-4, the cable stripper 100 further comprise a tension element 118 in the form of cantilever or spring arm 150 in operable communication with each blade, each tension element configured to exert a force effective to maintain the blade in a first or stripping blade position wherein a portion of the blade is disposed within the channel 108. The blade is configured to move within the blade pocket, wherein the blade is configured to move between the first stripping blade position and a second or passing blade position to allow sheathed cable to pass through the channel without cutting or stripping the sheath. The first blade position may correspond to a stripping operation mode, and the second blade position may correspond to a passing operation mode. The tension element may be configured to flex to allow for blade movement within the blade pocket upon insertion of a cable through the channel from the first aperture. The tension element may be integrated or molded with the housing. For example, the tension element may be formed by creating through holes from the exterior of the housing, such as through holes of blade pocket 114 shown in FIG. 2, 205.

FIG. 3 shows a sectional view of the sheathed cable stripper with blade 112 in the first or stripping blade position corresponding to a stripping operation mode. FIG. 3, 305 shows the front view of the sheathed cable stripper, and FIG. 3, 310 shows the sectional view of the first half of the sheathed cable stripper corresponding to the dashed arrows in front view 305. As shown, tension element may be contained within the blade pocket, and wherein the tension element and pocket wall can define a slot for receiving and holding the blade. The tension element is positioned and angled to maintain the blade in a first blade position in the absence of any other force being exerted on the blade. The blade pocket may be defined by at a first pocket wall 152 and a second pocket wall 154, the blade pocket having an interior volume 156 effective to contain a blade. As shown, the first blade position is configured to cause the cutting edge of the blade to be positioned within the channel effective to incise a portion of a sheath of a sheathed cable traveling therethrough, where a rear face of the blade is configured to be positioned against a first pocket wall. In the first blade position, the cutting edge and at least a portion of cutting face of the at least one blade is configured to extend into the channel, and wherein the cutting edge of the blade is configured to extend outside of the interior volume of the blade pocket.

FIG. 4 shows a sectional view of the sheathed cable stripper with blade 112 in the second or passing blade position corresponding to a passing operation mode. FIG. 4, 405 shows the front view of the sheathed cable stripper, and FIG. 4, 410 shows the sectional view of the second half of the sheathed cable stripper corresponding to the dashed arrows in front view 405. The hardware configurations shown in FIG. 4 allows the stripper to pass over the cable without cutting the cable. The blade is configured to move from the first blade position to the second blade position when a cable is pulled through the channel in a direction traveling from the first aperture to the second aperture. The passing mode operation corresponds to the blade moving from the first blade position to the second blade position when a cable is pulled through the channel in a direction traveling from the first aperture to the second aperture. In the second blade position, the cutting face of the blade is configured to be positioned against a second pocket wall as shown. The blade is configured to move from the second blade position to the first blade position when a cable is travelling through the channel in a travel direction from the second aperture to the first aperture or when the housing is pulled in opposite direction. In the second blade position, substantially all of the blade is retracted into the blade pocket upon a cable traveling through the channel in a first travel direction from the first aperture to the second aperture. The blade is configured to return from the second blade position to the first blade position upon the cable traveling through the channel in a second travel direction from the second aperture to the first aperture and/or when the channel is unoccupied. The blades are angled in the housing using the tension elements (e.g., cantilever arms, spring arms) to allow for blade movement within the blade pocket upon insertion of a cable through the channel from the first aperture.

The blade is configured to rotate about an axis, And may be configured to rotate from greater than 0 degrees to about 45 degrees about the axis, such from greater than 0 degrees to about 30 degrees or from greater than 0 degrees to about 15 degrees about the axis, including exemplary values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, and 44 degrees. In the first blade position, a bisecting angle Y1 formed by the rear face of the blade and a horizontal plane corresponding to a top (or bottom) edge of the channel is from greater than 0 degrees to about 60 degrees, such as from greater than 0 degrees to about 45 degrees or from greater than 15 degrees to about 45 degrees, including exemplary values of 16, 17, 18, 19, 20, 21, 22, 23, 24, 25, 26, 27, 28, 29, 30, 31, 32, 33, 34, 35, 36, 37, 38, 39, 40, 41, 42, 43, and 44 degrees. In the second blade position, a bisecting angle Y2 formed by the rear face of the blade and a horizontal plane corresponding to a top (or bottom) edge of the channel is from greater than 0 degrees to about 60 degrees, such as from greater than 0 degrees to about 45 degrees or from greater than 0 degrees to about 30 degrees, including exemplary values of 1, 2, 3, 4, 5, 6, 7, 8, 9, 10, 11, 12, 13, 14, 15, 16, 17, 18, 19, 20, 21, 22, 23, 24, 25, 26, 27, 28, and 29 degrees. The absolute value of Y1-Y2 may correspond to the rotational angle traveled between the two positions.

Figure 5:
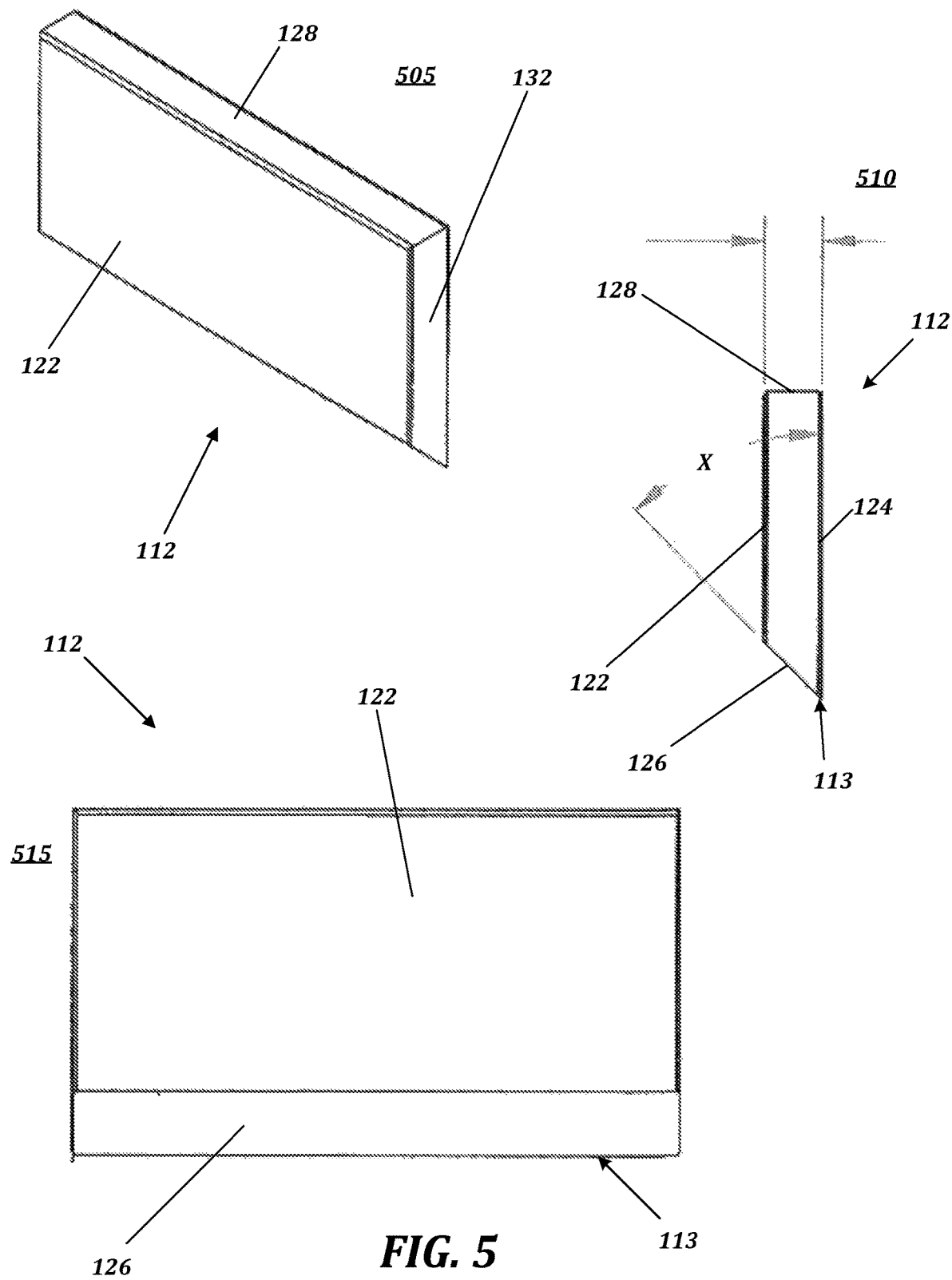
FIG. 5 shows multiple views of a blade from a sheathed cable stripper in accordance with an exemplary embodiment of the present disclosure.

FIG. 5 shows multiple views of exemplary blade 112 contained in the disclosed sheathed cable strippers in accordance with another exemplary embodiment. More specifically, FIG. 5, 505 shows the isometric view of blade 112, FIG. 5, 510 shows the side view of the blade, and FIG. 5, 515 shows the front view of the blade 112. Blade may have a front face 122, a rear face 124, a cutting face 126, a top face 128, and at least one side face 132. The shared edge of the rear face and cutting face is the cutting edge 113, where the rear face and cutting face meet to define cutting edge 113. Angle X formed by the cutting face and rear face of the blade is from greater than 0 degrees to about 75 degrees, such as from greater than 0 degrees to about 60 degrees, from greater than 15 degrees to about 60 degrees, or from greater than 0 degrees to about 45 degrees, including exemplary values of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, and 44 degrees.

In further aspects, FIGS. 6A-7C and 9A-10C show various aspects and features of another cable stripper device 600 in accordance with another exemplary embodiment of the present disclosure.

Figure 6A:
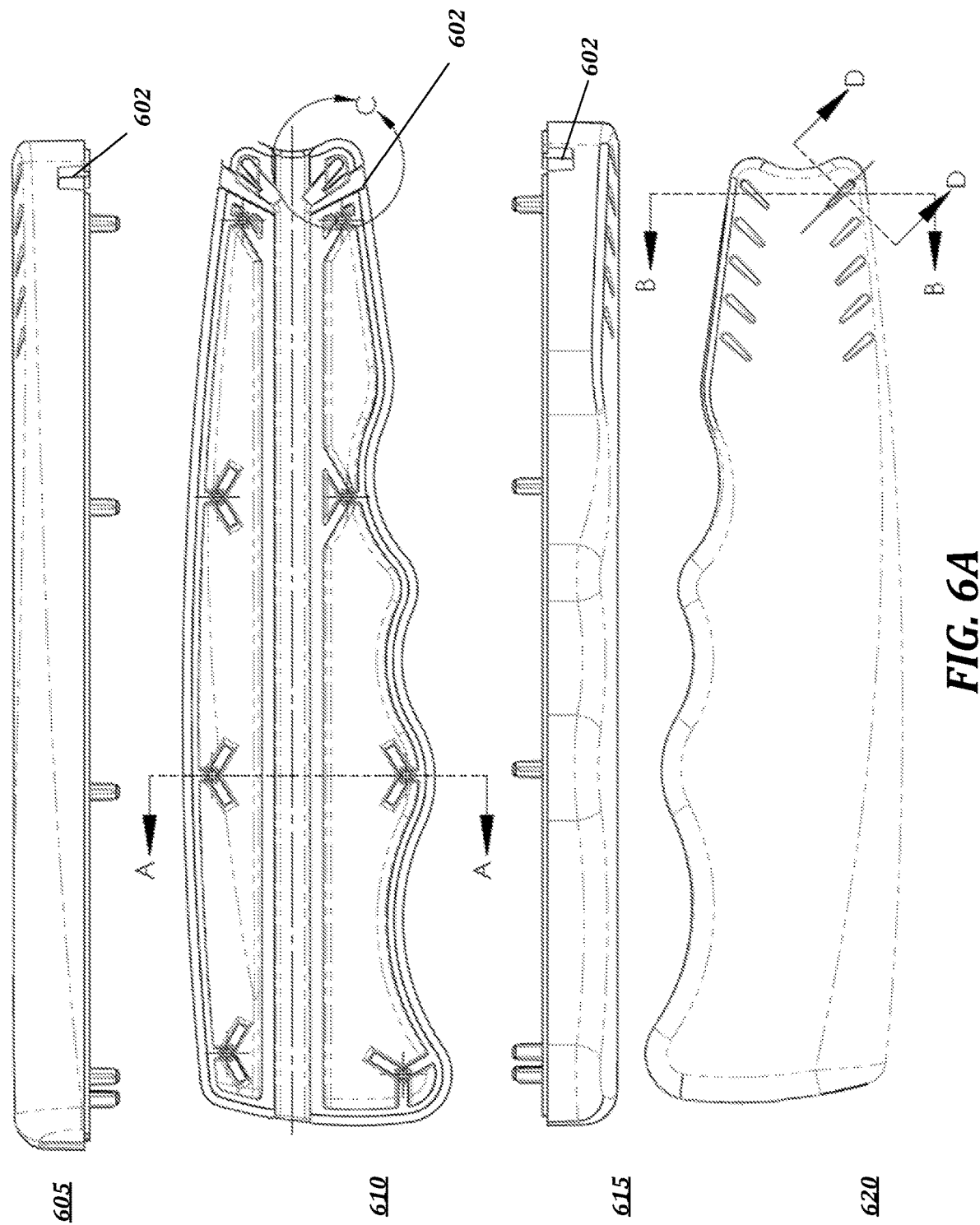
FIGS. 6A-6C show multiple views of a first half of sheathed cable stripper in accordance with an exemplary embodiment of the present disclosure.
Figure 6B:
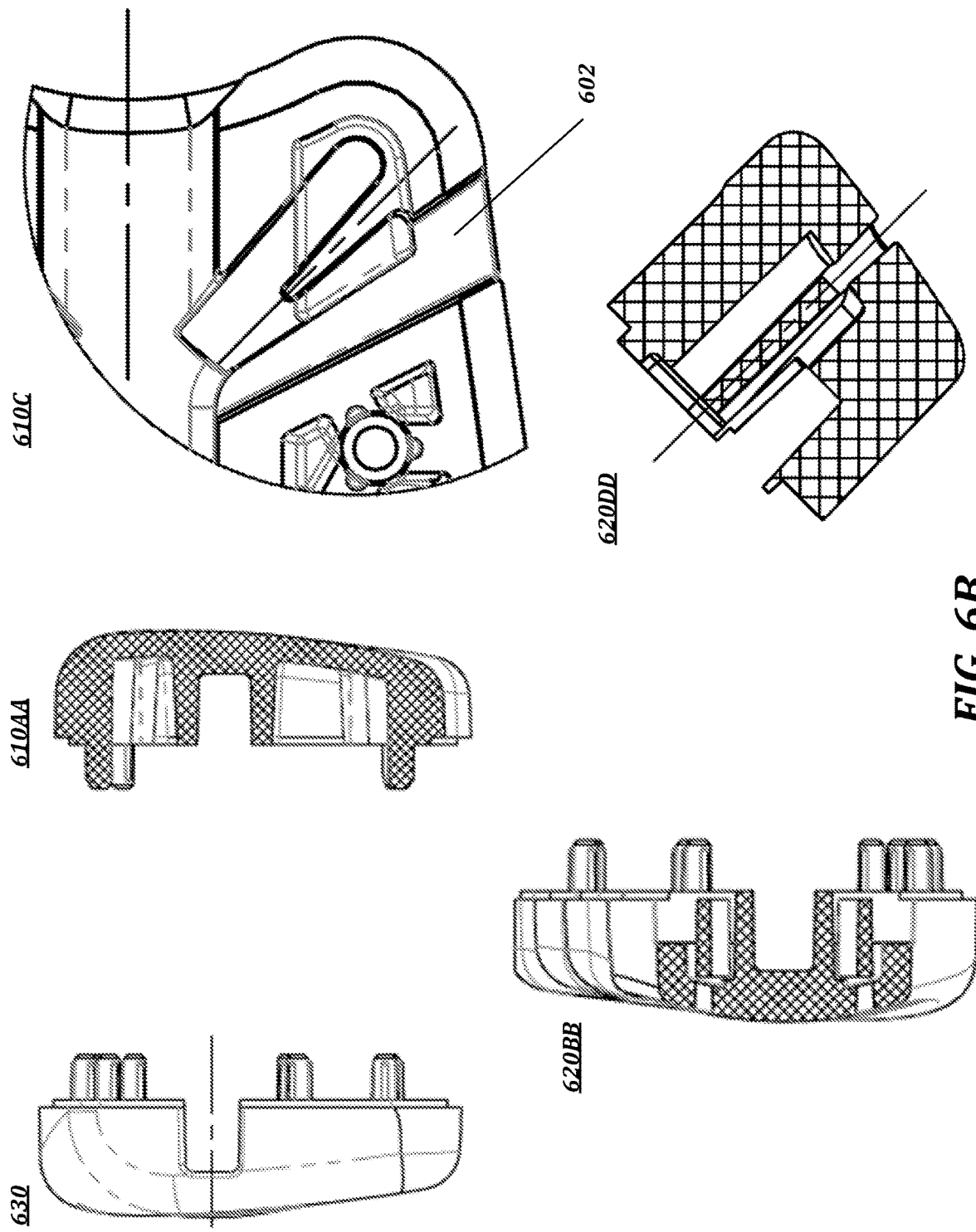
Figure 6C:
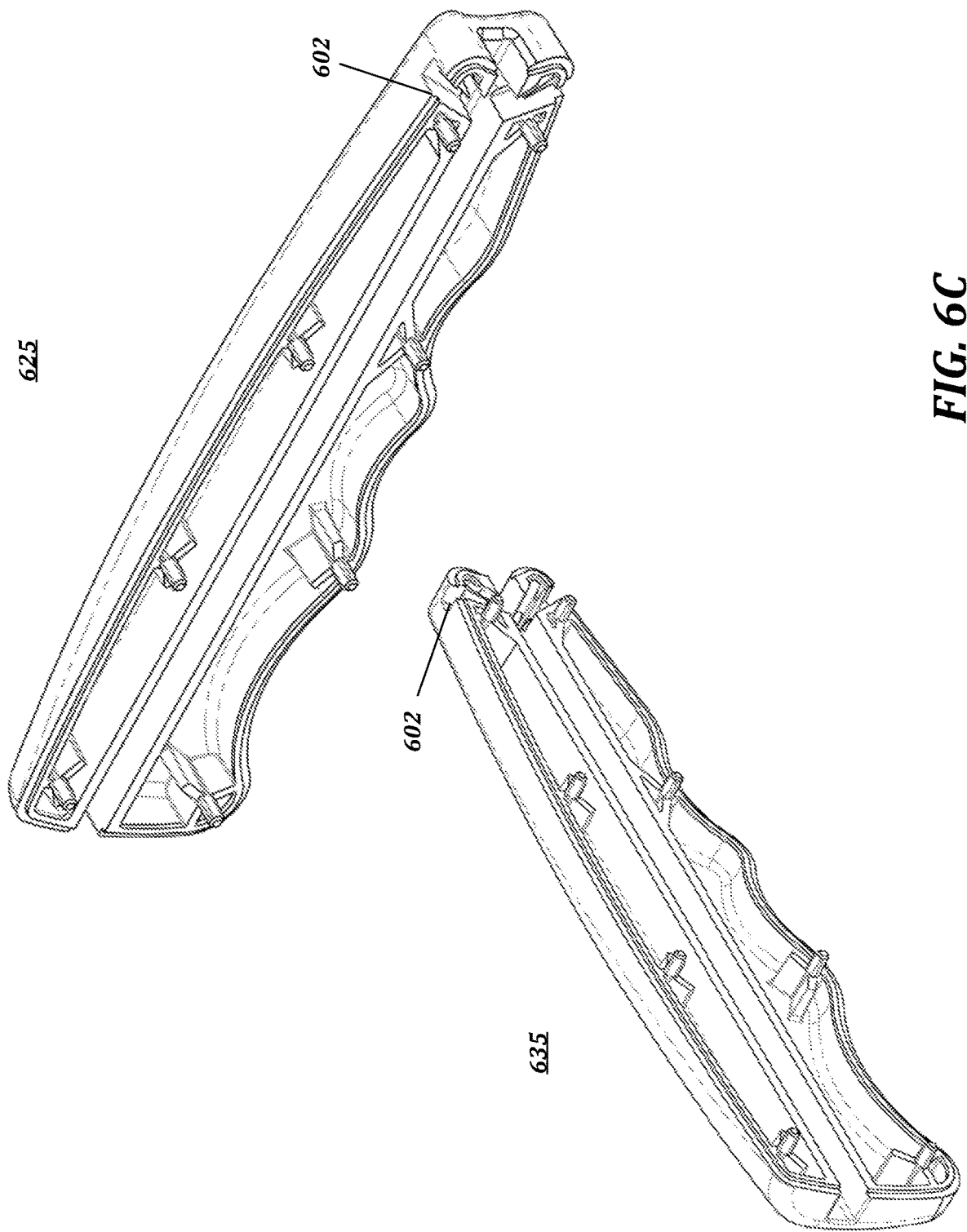

FIGS. 6A-6C shows multiple views of a first half of a sheathed cable stripper 600 that include clean out apertures 602 in accordance with another exemplary embodiment of the present disclosure. More specifically, FIG. 6A, 605 shows the top view of the first half of the sheathed cable stripper, FIG. 6A, 610 shows the sectional view of the first half, FIG. 6A, 615 shows the bottom view of the first half of the sheathed cable stripper, and FIG. 6A, 620 shows the side view of the first half of the sheathed cable stripper. FIG. 6B, 610AA shows a rear sectional view corresponding to reference arrows A in view 610, FIG. 6B, 610C shows the detailed view of blade pocket corresponding to circle C from 610, FIG. 6B, 630 shows a rear view of the first half of the sheathed cable stripper, FIG. 6B, 620BB shows a rear sectional view corresponding to reference arrows B from view 620, and FIG. 6B, 620DD shows a sectional detail corresponding to reference arrows D from 620. FIG. 6C, 625 and 635 show first and second isometric views of the interior first half housing of the sheathed cable stripper.

Figure 7A:
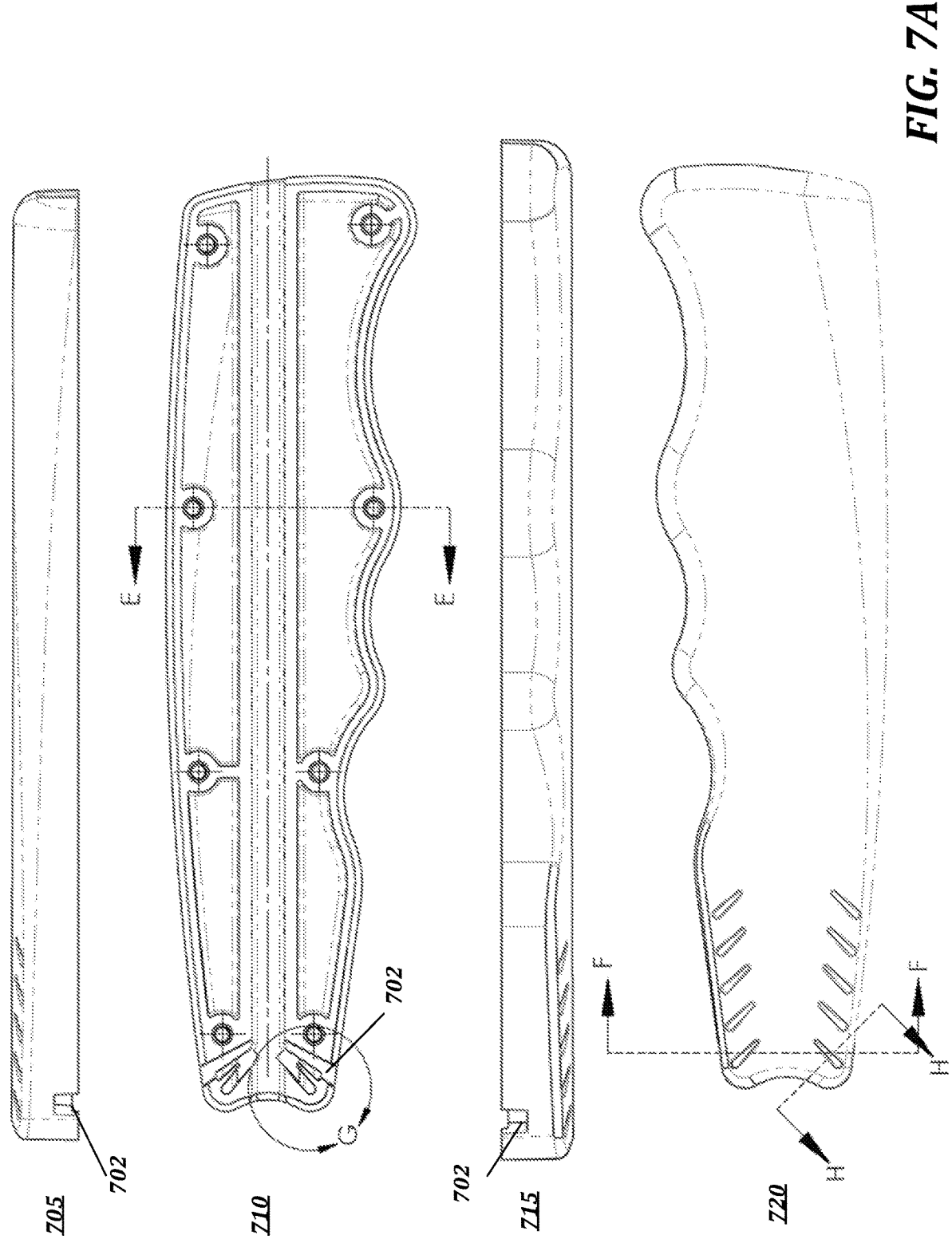
FIGS. 7A-7C show multiple views of a second half of sheathed cable stripper in accordance with an exemplary embodiment of the present disclosure.
Figure 7B:
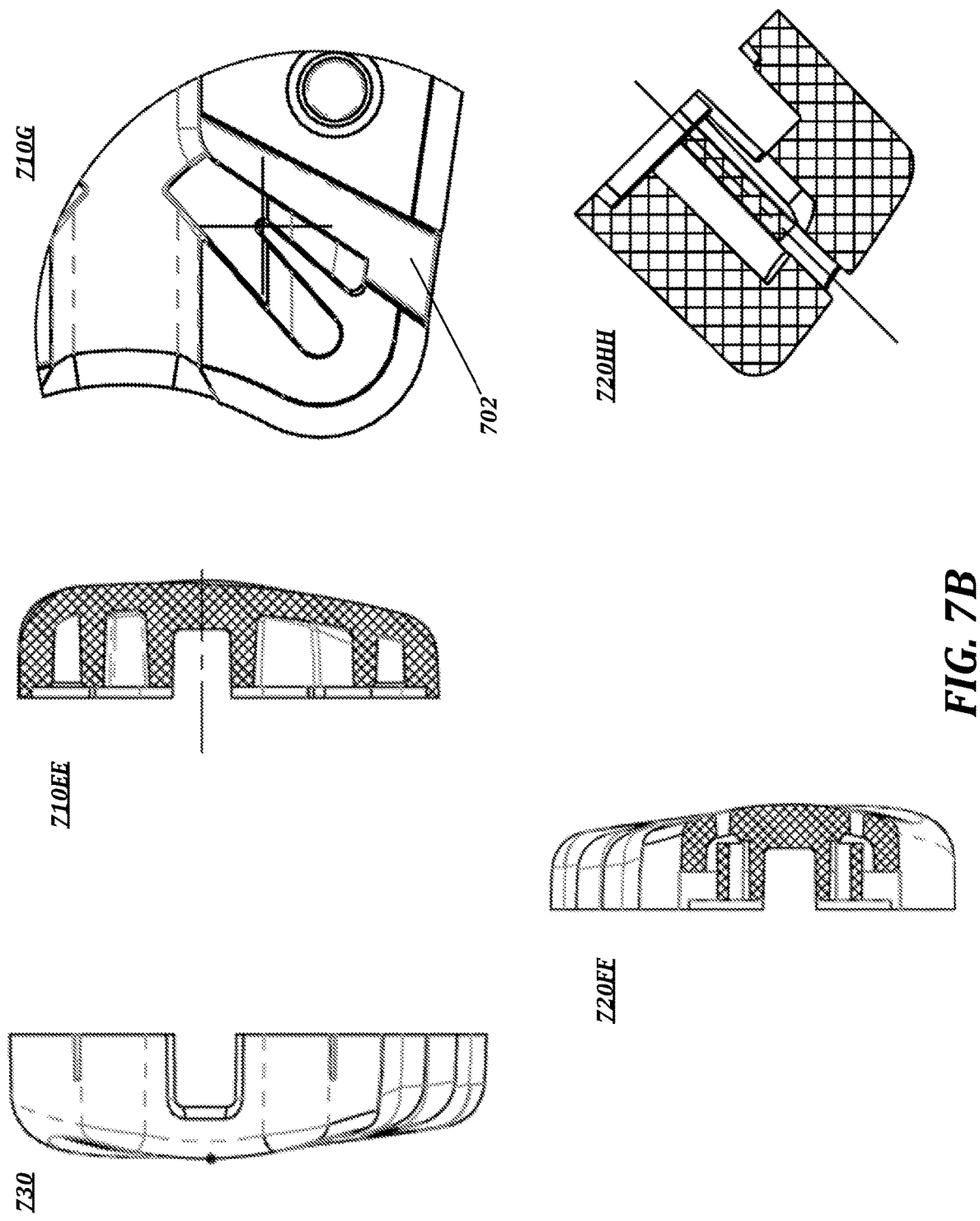
Figure 7C:
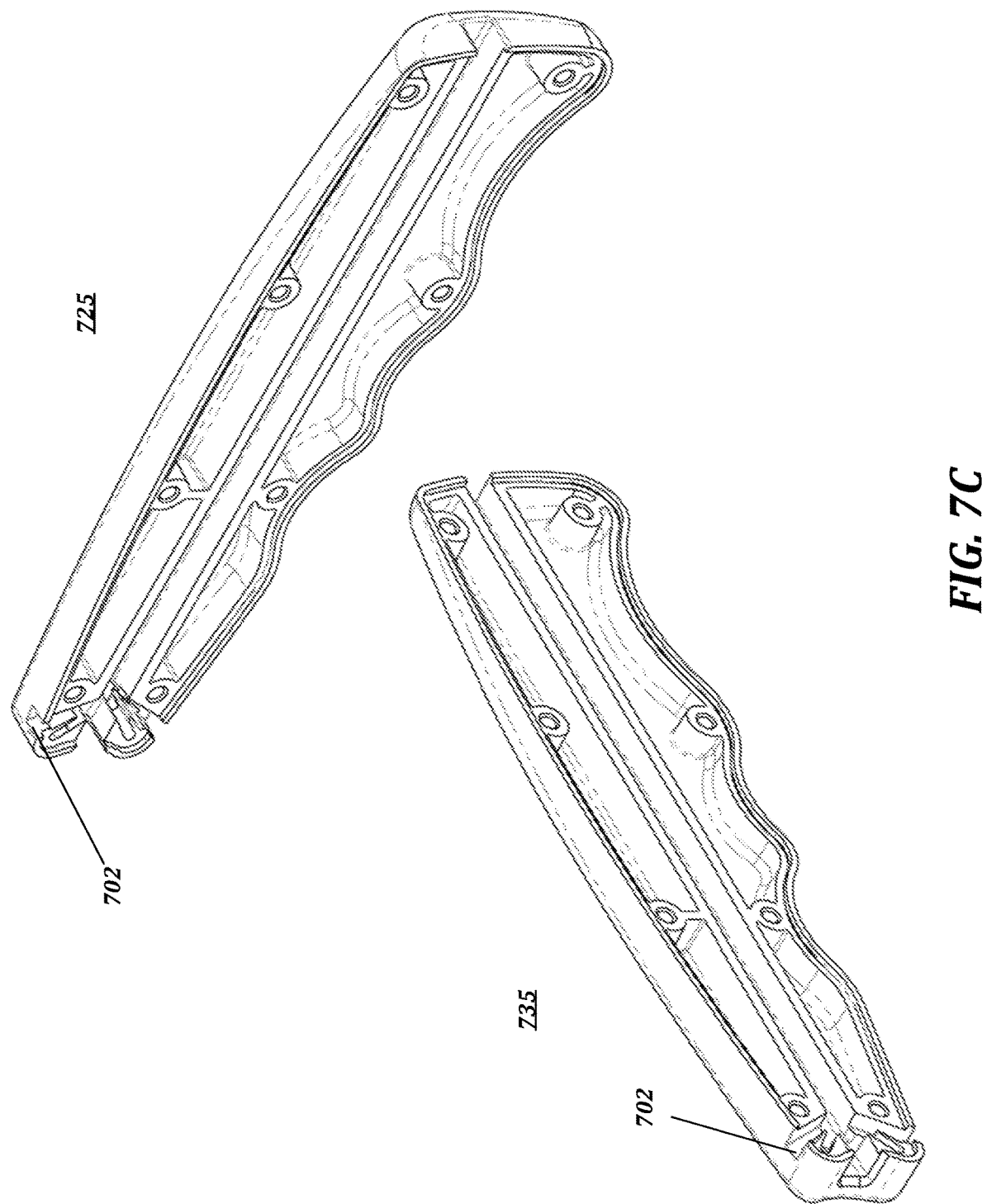

FIGS. 7A-7C shows multiple views of a first half of a sheathed cable stripper that include clean out apertures 702 in accordance with another exemplary embodiment of the present disclosure. More specifically, FIG. 7A, 705 shows the top view of the second half of the sheathed cable stripper, FIG. 7A, 710 shows the sectional view of the second half, FIG. 7A, 715 shows the bottom view of the second half of the sheathed cable stripper, and FIG. 7A, 720 shows the side view of the second half of the sheathed cable stripper. FIG. 7B, 710EE shows a rear sectional view corresponding to reference arrows E in view 710, FIG. 7B, 710G shows the detailed view of blade pocket corresponding to circle G from 710, FIG. 7B, 730 shows a rear view of the second half of the sheathed cable stripper, FIG. 7B, 720FF shows a rear sectional view corresponding to reference arrows F from view 720, and FIG. 7B, 720HH shows a sectional detail corresponding to reference arrows H from 720. FIG. 7C, 725 and 735 show first and second isometric views of the interior second half housing of the sheathed cable stripper.

Figure 9A:
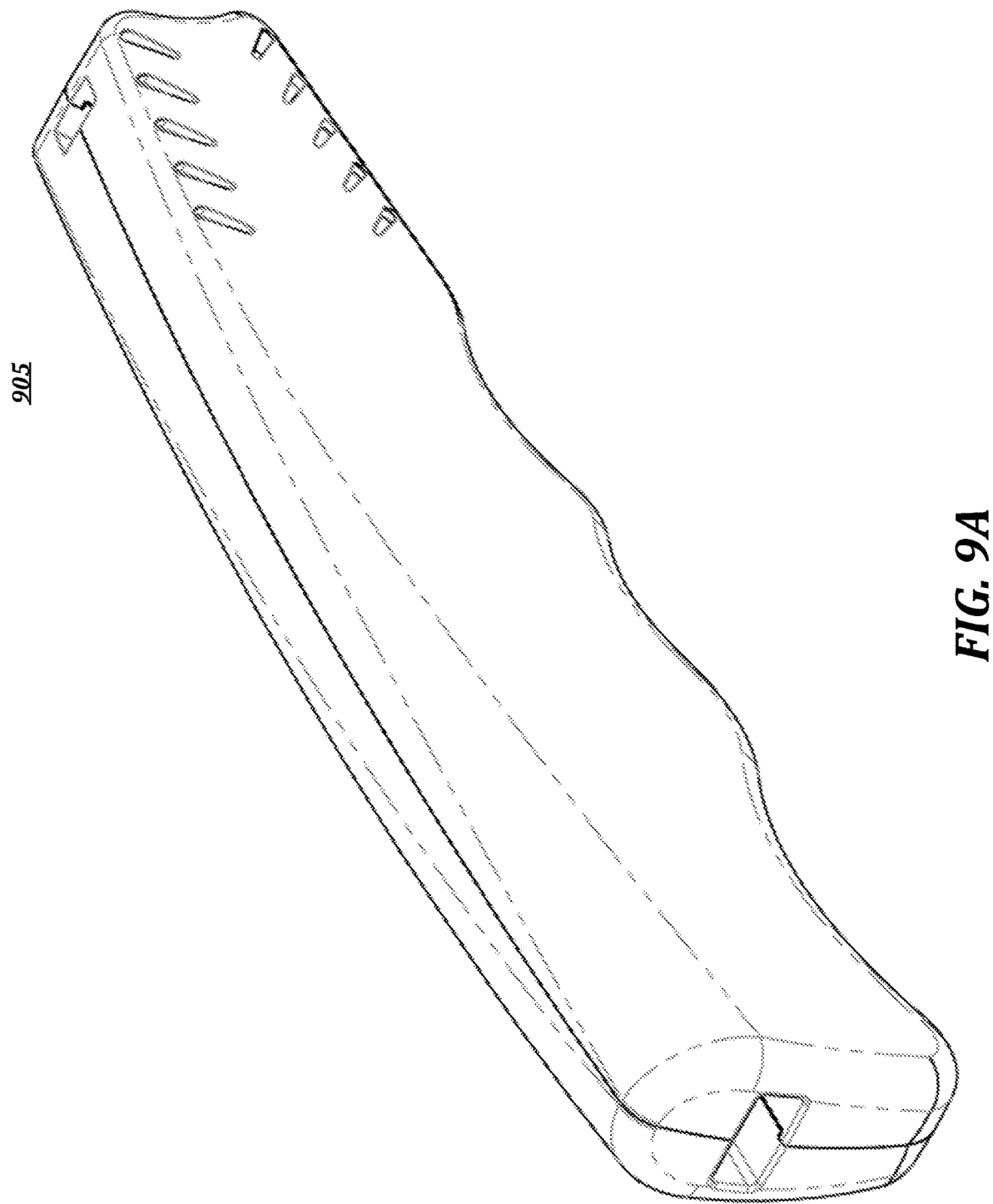
FIGS. 9A-B show multiple views of a sheathed cable stripper in accordance with an exemplary embodiment of the present disclosure.
Figure 9B:
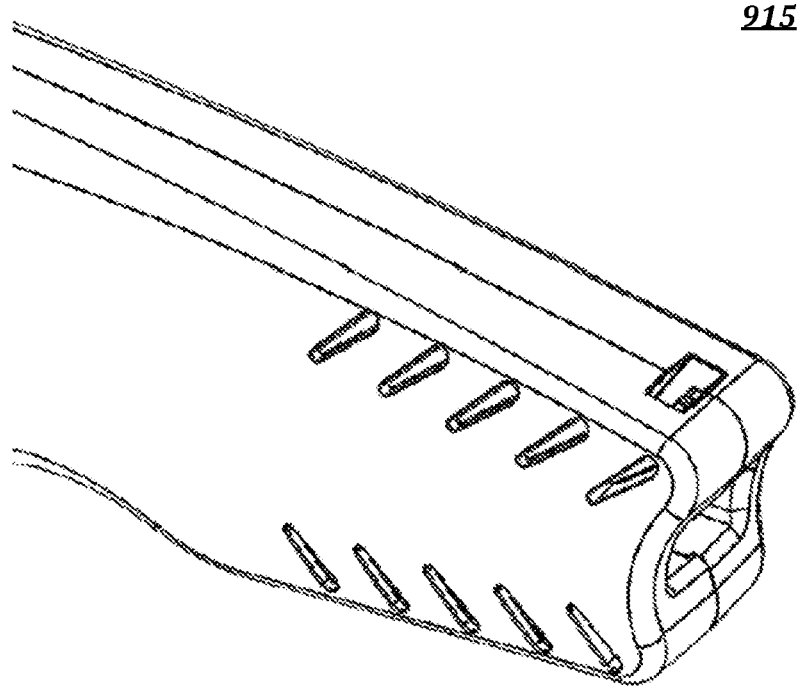
Figure 9B:
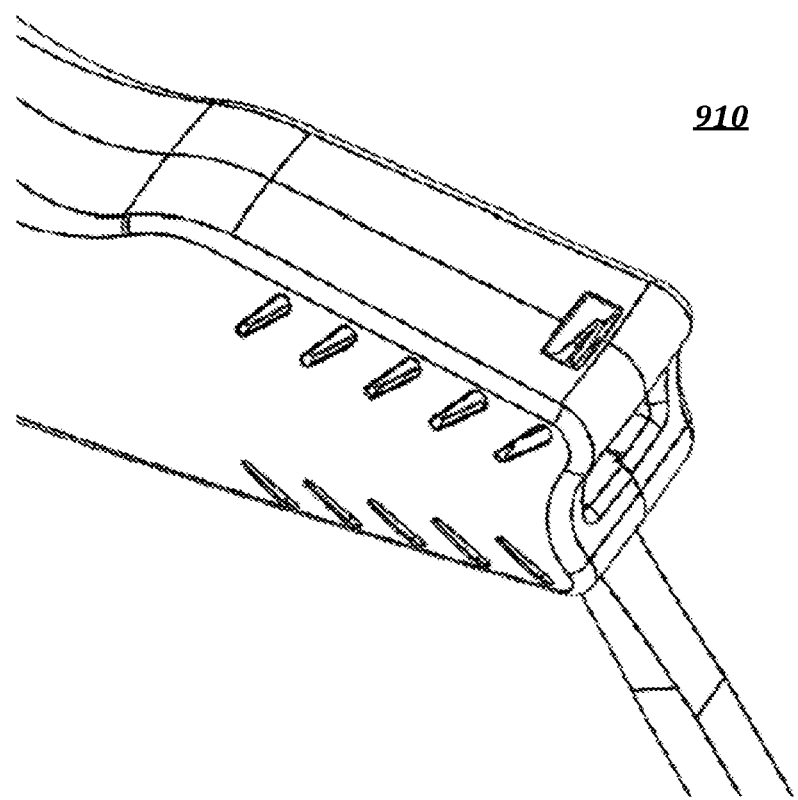
Figure 10A:
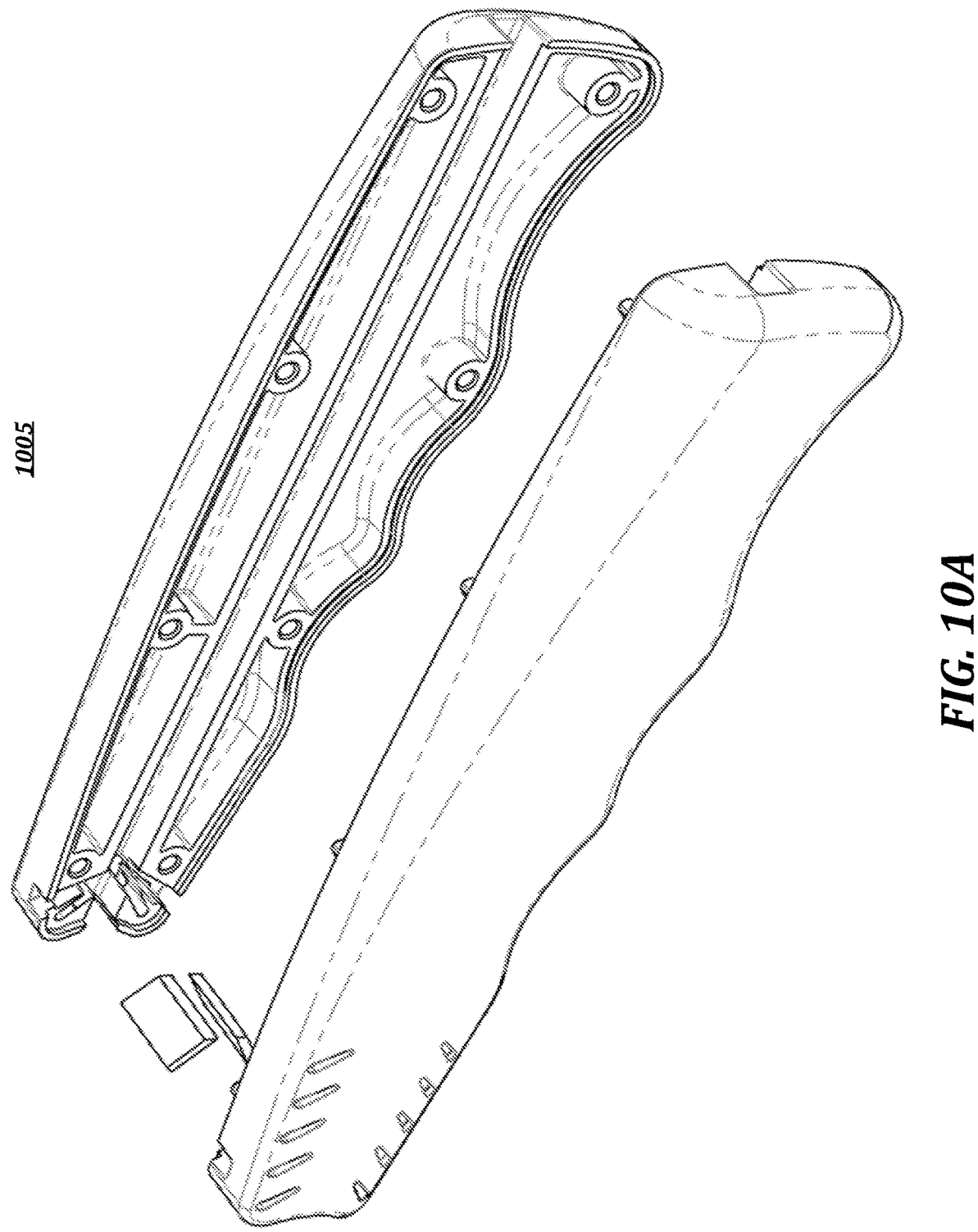
FIGS. 10A-C show multiple views of a sheathed cable stripper in accordance with an exemplary embodiment of the present disclosure.
Figure 10B:
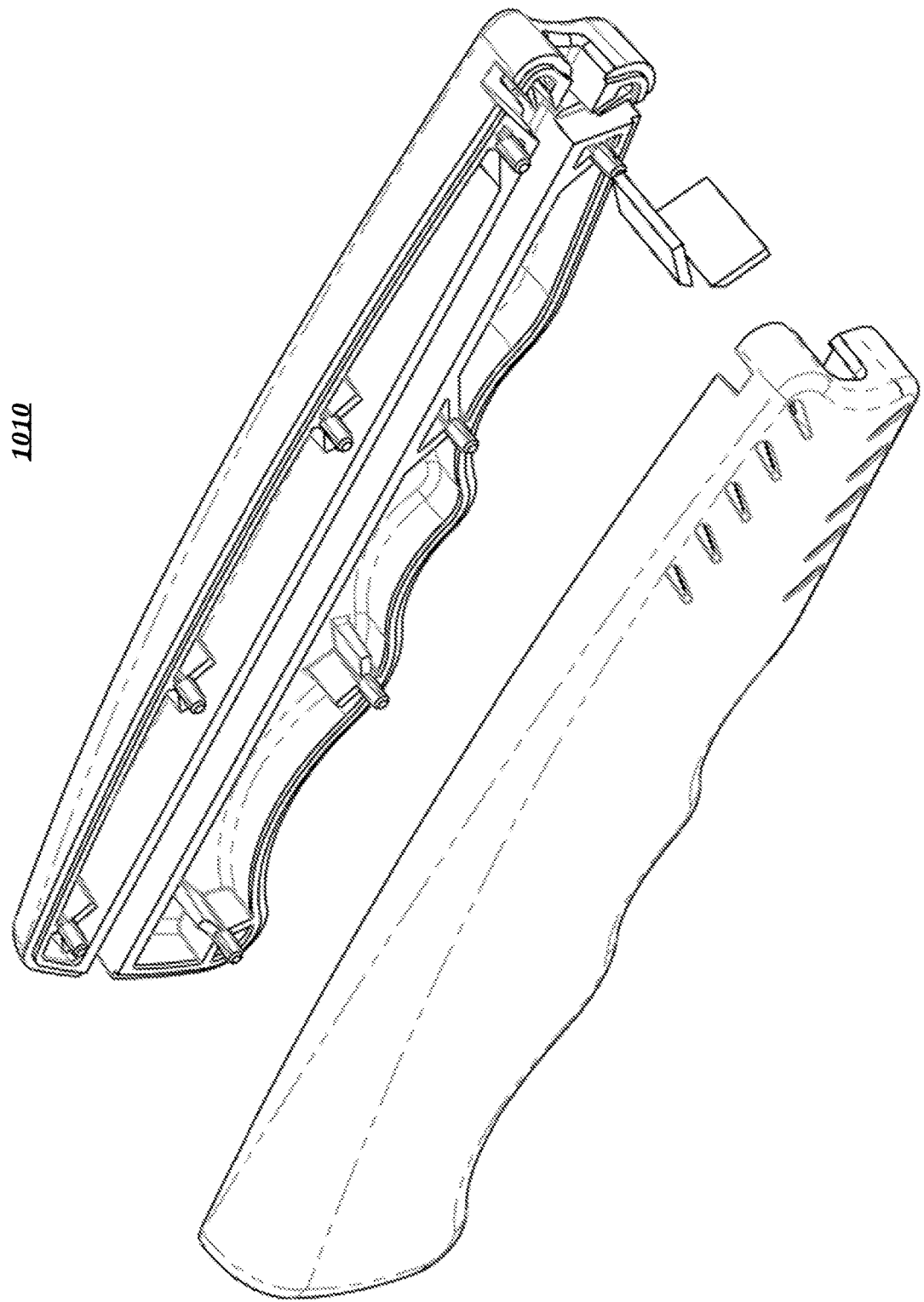
Figure 10C:
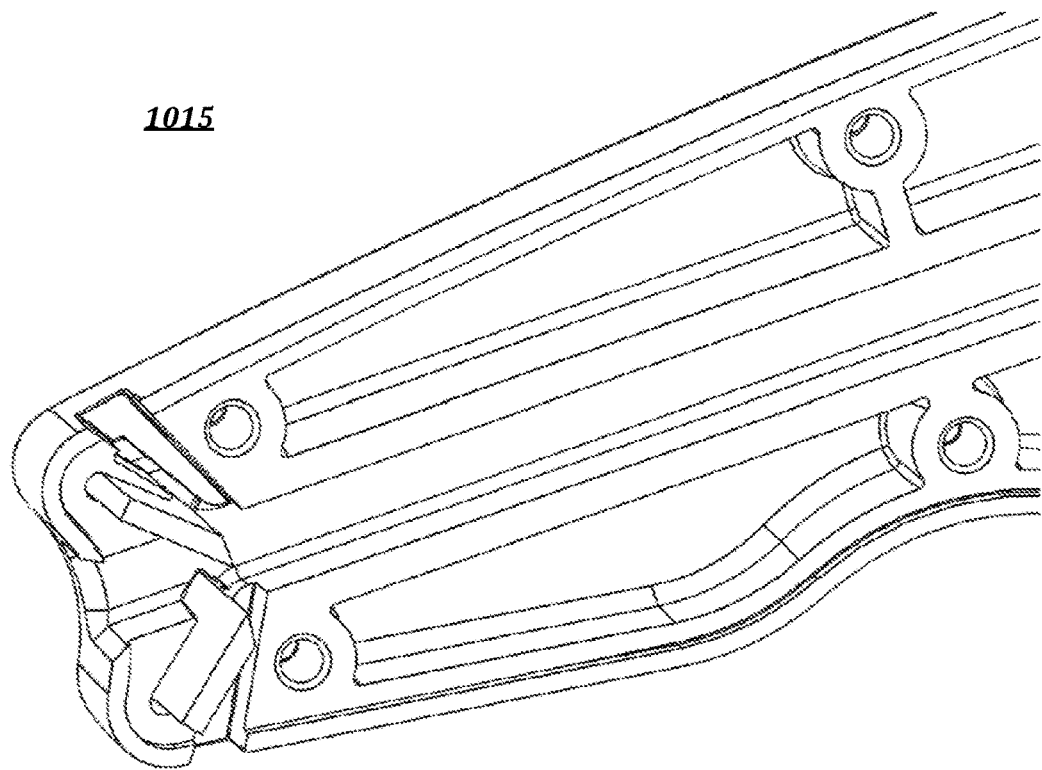
Figure 10C:
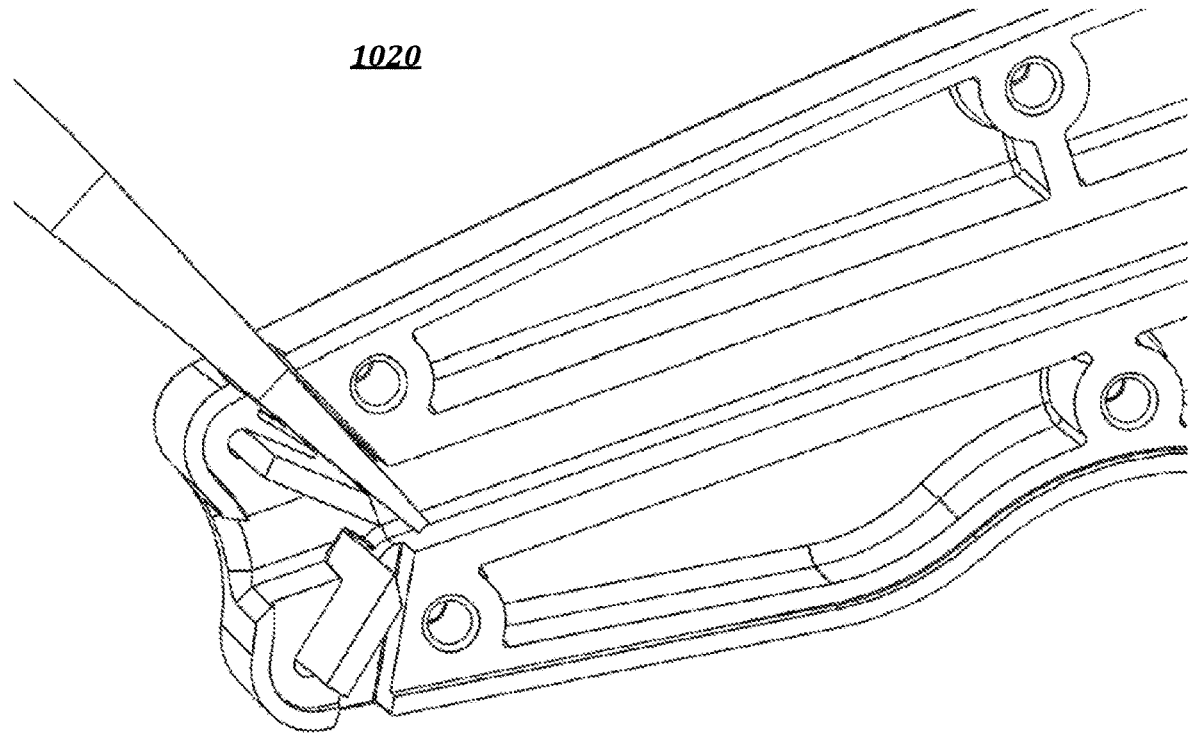

FIGS. 9A-10C shows multiple views of the sheathed cable stripper that include clean out apertures in accordance with another exemplary embodiment of the present disclosure. More specifically, FIG. 9A, 905 shows a perspective view of the housing with clean out hole at the front end, FIG. 9B, 915 shows a close up top view of the housing with clean out hole empty, and FIG. 9B, 910 shows a close up bottom view of the housing with the bottom clean out hole empty and the top clean out hole occupied by a flat head screwdriver. FIG. 10A, 1005 shows a first exploded view of the sheathed cable stripper housing with clean out hole and blades; FIG. 10B, 1010 shows a second exploded view of the sheathed cable stripper housing with clean out hole and blades; FIG. 10C, 1015 shows the interior section view of the housing and blades, with both the top and bottom clean out holes unoccupied, and FIG. 10C, 1020 shows the interior section view of the housing and blades, with a flat head screwdriver inserted into the top clean out hole.

As described herein, the present disclosure also provides methods of using the disclosed devices and systems. According to various aspects, the disclosed stripper devices work by sliding the non-metallic sheathed cable (NMSC) straight through the wire channel, and then pulling the stripper housing straight back towards the user in a snapping action. The first cable is pulled through the wire channel of the cable stripper housing until the cable stripper reaches the end of the exposed cable coming out of the junction box. The cable stripper is then pulled straight back toward the user and away from the junction box in a snapping motion to cleanly remove the sheathing without damage to the underlying conductors. The process can then be repeated for one or more other cables.

In one aspect, disclosed herein is a method for cutting and stripping non-metallic sheathed cable (NMSC) using a sheathed cable stripper. The method for cutting and stripping non-metallic sheathed cable (NMSC) using a sheathed cable stripper comprising:
A. Receiving a non-metallic sheathed cable in a wire channel of the sheathed cable stripper;
B. sliding the non-metallic sheathed cable through the wire channel; and
C. removing the sheathing of the non-metallic sheathed cable by pulling the sheathed cable stripper back toward the user.

In further aspects, the disclosed sheathed cable stripper and method can be used for cutting and removing sheathing from non-metallic sheathed cable. In yet other aspects, the sheathed cable stripper reduced time, labor costs for wiring while providing a safer, more effective, and efficient manner for cutting and removing sheathing from non-metallic sheathed cable.

Figure 8:
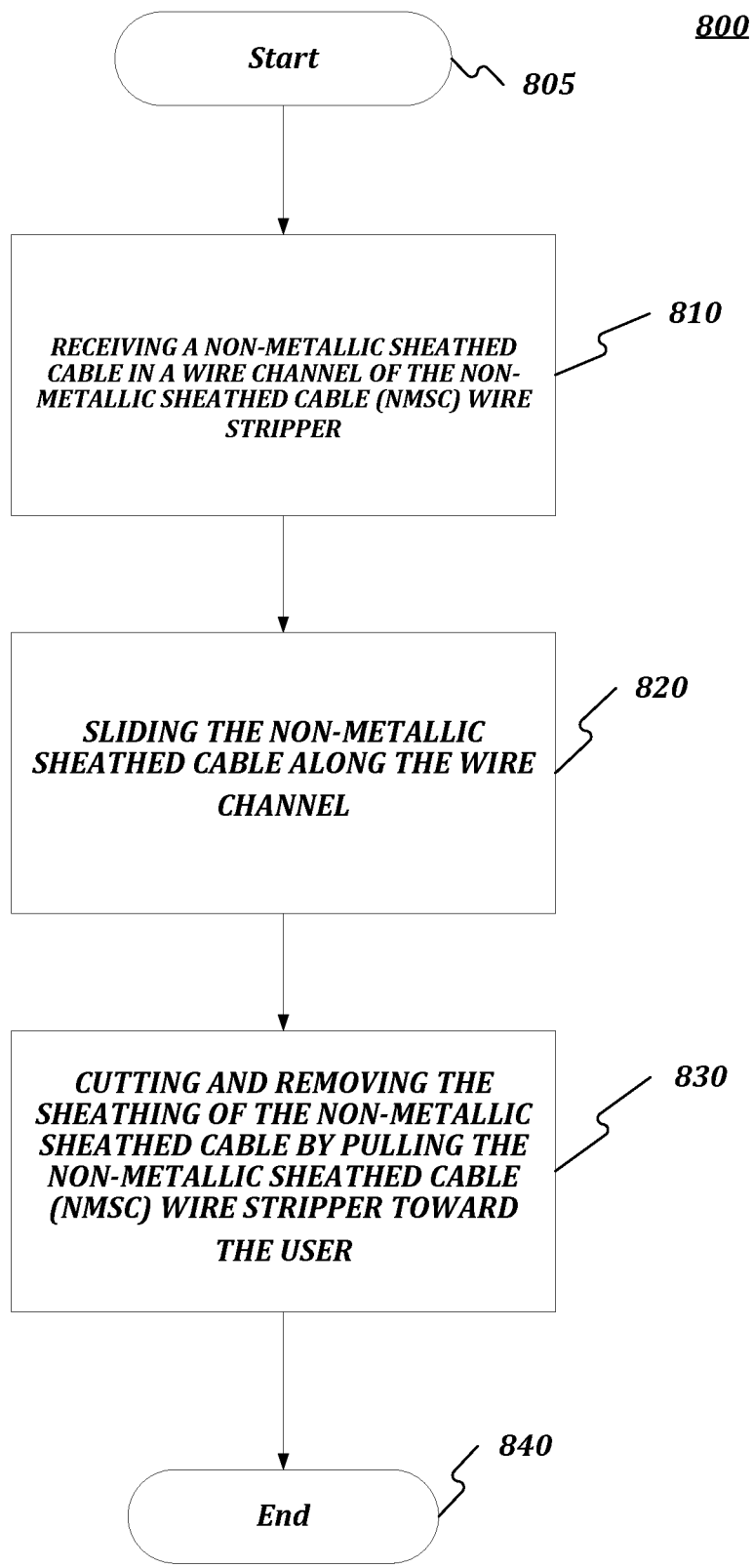
FIG. 8 is a flow chart of a method for using a disclosed sheathed cable stripper in accordance with an exemplary embodiment of the present disclosure.

FIG. 8 is a flow chart of a method for using the sheathed cable stripper in accordance with an exemplary embodiment of the present disclosure. FIG. 8 is a flow chart setting forth the general stages involved in a method 800 consistent with an embodiment of the disclosure for providing the sheathed cable stripper in accordance with an exemplary embodiment of the present disclosure. Although method 800 has been described to be performed by a first user, it should be understood that any number of users may be used to perform the various stages of method 800. Furthermore, in some embodiments, different operations may be performed by different users in operative communication with a first user.

Although the stages illustrated by the flow charts are disclosed in a particular order, it should be understood that the order is disclosed for illustrative purposes only. Stages may be combined, separated, reordered, and various intermediary stages may exist. Accordingly, it should be understood that the various stages illustrated within the flow chart may be, in various embodiments, performed in arrangements that differ from the ones illustrated. Moreover, various stages may be added or removed from the flow charts without altering or deterring from the fundamental scope of the depicted methods and systems disclosed herein. Ways to implement the stages of method 800 will be described in greater detail below.

Method 800 may begin at starting block 805 and proceed to stage 810 where a first user using the apparatus may receive a non-metallic sheathed cable in a wire channel of the apparatus. For example, a Romex™ cable may be received in the apparatus.

From stage 810, where a first user using the apparatus inserts a non-metallic sheathed cable into a wire channel of the apparatus, method 800 may advance to stage 820 where a first user using the apparatus may slide the non-metallic sheathed cable along the wire channel. For example, an electrician or technician may slide sheathed cable through the apparatus until the desired length is reached.

Once a first user using the apparatus slides the non-metallic sheathed cable along the wire channel in stage 820, method 800 may continue to stage 830 where a first user using the apparatus may cut and remove the sheathing of the non-metallic sheathed cable by pulling the apparatus toward the user. For example, an electrician or technician may strip the sheathing from the cable.

After a first user using the apparatus removes the sheathing of the non-metallic sheathed cable in stage 830, method 800 may then end at stage 840.

The present invention includes at least the following aspects:

Aspect 1: A device for stripping sheathed cable, the device comprising: a housing having a first aperture at a first end of the housing, a second aperture at an opposed second end of the house, and a channel between the first and second ends, the channel configured to allow a sheathed cable to travel therethrough; at least one blade contained in a blade pocket within the housing, each blade defined by a cutting edge configured to cut or incise at least a portion of a sheath of the sheathed cable; and at least one tension element in operable communication with the at least one blade, each tension element configured to exert a force effective to maintain a blade in a first blade position wherein a portion of the blade is disposed within the channel.

Aspect 2: The device of any preceding claim, further comprising a plurality of blades, each blade being contained in a pocket within the housing.

Aspect 3: The device of any preceding claim, wherein each blade comprises at least a front face, a rear face, and a cutting face.

Aspect 4: The device of any preceding claim, wherein each blade comprises a front face, a rear face, a cutting face, a top face, and at least one side face.

Aspect 5: The device of any preceding claim, the cutting face is defined by a first edge of the front face and first edge of the rear face.

Aspect 6: The device of any preceding claim, the cutting face is defined by a first shared edge with the front face and a second shared edge with the rear face.

Aspect 7: The device of any preceding claim, the shared edge of the rear face and cutting face is the cutting edge.

Aspect 8: The device of any preceding claim, the rear face and cutting face meet to define the cutting edge.

Aspect 9: The device of any preceding claim, wherein an angle formed by the cutting face and rear face of the blade is from greater than 0 degrees to about 75 degrees.

Aspect 10: The device of any preceding claim, wherein an angle formed by the cutting face and rear face of the blade is from greater than 0 degrees to about 60 degrees.

Aspect 11: The device of any preceding claim, wherein an angle formed by the cutting face and rear face of the blade is from greater than 0 degrees to about 45 degrees.

Aspect 12: The device of any preceding claim, further comprising a plurality of tension elements, each tension element being in operable communication with one blade of the plurality of blades to maintain the one blade in the first blade position.

Aspect 13: The device of any preceding claim, wherein the tension element comprises a cantilever arm or spring arm.

Aspect 14: The device of any preceding claim, wherein the tension element is contained within the blade pocket.

Aspect 15: The device of any preceding claim, wherein the tension element and pocket wall define a slot for receiving and holding the blade.

Aspect 16: The device of any preceding claim, wherein the tension element is positioned and angled to maintain the blade in a first blade position in the absence of any other force being exerted on the blade.

Aspect 17: The device of any preceding claim, wherein the blade pocket is defined by at least a first pocket wall and a second pocket wall, the blade pocket comprising an interior volume configured to contain a blade.

Aspect 18: The device of any preceding claim, wherein the at least one blade is configured to move within the blade pocket.

Aspect 19: The device of any preceding claim, wherein the blade is configured to move between a first blade position and a second blade position.

Aspect 20: The device of any preceding claim, wherein at least a portion of the blade is attached or connected to the blade pocket.

Aspect 21: The device of any preceding claim, wherein an attachment point or connection point of the blade comprises an axis, and wherein the blade is configured to rotate about the axis.

Aspect 22: The device of any preceding claim, wherein the blade is configured to rotate about an axis.

Aspect 23: The device of any preceding claim, wherein the blade is configured to rotate from greater than 0 degrees to about 45 degrees about the axis.

Aspect 24: The device of any preceding claim, wherein the blade is configured to rotate from greater than 0 degrees to about 30 degrees about the axis.

Aspect 25: The device of any preceding claim, wherein the blade is configured to rotate from greater than 0 degrees to about 15 degrees about the axis.

Aspect 26: The device of any preceding claim, wherein at least one blade position is configured to cause the cutting edge of the blade to positioned within the channel effective to incise a portion of a sheath of a sheathed cable traveling therethrough.

Aspect 27: The device of any preceding claim, wherein at least one blade position corresponds to a stripping operation mode of the device, and one blade position corresponds to a passing operation mode of the device.

Aspect 28: The device of any preceding claim, wherein the first blade position and corresponds to a stripping operation mode of the device.

Aspect 29: The device of any preceding claim, wherein the second blade position corresponds to a passing operation mode of the device.

Aspect 30: The device of any preceding claim, wherein the passing operation mode of the device corresponds to a cable traveling through the channel in a first travel direction from the first aperture to the second aperture.

Aspect 31: The device of any preceding claim, wherein the stripping operation mode of the device corresponds to a cable traveling through the channel in a second travel direction from the second aperture to the first aperture.

Aspect 32: The device of any preceding claim, wherein at least one blade position is configured to cause the cutting edge of the blade to incise a portion of a sheath of a sheathed cable.

Aspect 33: The device of any preceding claim, wherein in the first blade position, a rear face of the blade is configured to be positioned against the first pocket wall.

Aspect 34: The device of any preceding claim, wherein in the second blade position, a cutting face of the blade is configured to be positioned against the second pocket wall.

Aspect 35: The device of any preceding claim, wherein in the first blade position, each tension element is configured to maintain a rear face of the blade being in operable communication with one blade of the plurality of blades to maintain the one blade in the first blade position.

Aspect 36: The device of any preceding claim, wherein the blade is configured to move from the first blade position to the second blade position when a cable is pulled through the channel in a direction traveling from the first aperture to the second aperture.

Aspect 37: The device of any preceding claim, wherein the passing mode operation corresponds to the blade moving from the first blade position to the second blade position when a cable is pulled through the channel in a direction traveling from the first aperture to the second aperture.

Aspect 38: The device of any preceding claim, wherein the blade is configured to move from the second blade position to the first blade position when a cable is pulled through the channel in a direction traveling from the second aperture to the first aperture.

Aspect 39: The device of any preceding claim, wherein the stripping operation mode corresponds to blade moving from the second blade position to the first blade position when a cable is pulled through the channel in a direction traveling from the second aperture to the first aperture.

Aspect 40: The device of any preceding claim, wherein a force from pulling a cable through the channel in a direction traveling from the first aperture to the second aperture is configured to move the blade from the first blade position to the second blade position.

Aspect 41: The device of any preceding claim, wherein the tension element is configured to return the blade to the first blade position when the channel is unoccupied.

Aspect 42: The device of any preceding claim, wherein in a first blade position, at least a portion of the at least one blade is configured to extend into the channel in a distance of from about 0.01 inches to about 0.2 inches.

Aspect 43: The device of any preceding claim, wherein in the first blade position, the cutting edge and at least a portion of cutting face of the at least one blade is configured to extend into the channel.

Aspect 44: The device of any preceding claim, wherein the cutting edge of the blade is configured to extend outside of the interior volume of the blade pocket.

Aspect 45: The device of any preceding claim, wherein in a second blade position, substantially all of the blade is retracted into the blade pocket upon a cable traveling through the channel in a first travel direction from the first aperture to the second aperture.

Aspect 46: The device of any preceding claim, wherein the blade is configured to return from the second blade position to the first blade position upon the cable traveling through the channel in a second travel direction from the second aperture to the first aperture and/or when the channel is unoccupied.

Aspect 47: The device of any preceding claim, wherein the blades are angled in the housing using the tension elements (e.g., cantilever arms, spring arms) to allow for blade movement within the blade pocket upon insertion of a cable through the channel from the first aperture.

Aspect 48: The device of any preceding claim, wherein the blades are angled in housing and configured to extend into the channel.

Aspect 49: The device of any preceding claim, wherein in the first blade position, a bisecting angle formed by the cutting face of the blade and a horizontal plane corresponding to a first (or top) or second (or bottom) edge of the channel is from greater than 0 degrees to about 135 degrees.

Aspect 50: The device of any preceding claim, wherein in the first blade position, a bisecting angle formed by the cutting face of the blade and a horizontal plane corresponding to a first (or top) or second (or bottom) edge of the channel is from greater than 0 degrees to about 90 degrees.

Aspect 51: The device of any preceding claim, wherein in the first blade position, a bisecting angle formed by the cutting face of the blade and a horizontal plane corresponding to a first (or top) or second (or bottom) edge of the channel is from greater than 15 degrees to about 90 degrees.

Aspect 52: The device of any preceding claim, wherein in the first blade position, a bisecting angle formed by the cutting face of the blade and a horizontal plane corresponding to a first (or top) or second (or bottom) edge of the channel is from greater than 30 degrees to about 90 degrees.

Aspect 53: The device of any preceding claim, wherein in the first blade position, a bisecting angle formed by the rear face of the blade and a horizontal plane corresponding to a first (or top) or second (or bottom) edge of the channel is from greater than 0 degrees to about 60 degrees.

Aspect 54: The device of any preceding claim, wherein in the first blade position, a bisecting angle formed by the rear face of the blade and a horizontal plane corresponding to a first (or top) or second (or bottom) edge of the channel is from greater than 0 degrees to about 45 degrees.

Aspect 55: The device of any preceding claim, wherein in the first blade position, a bisecting angle formed by the rear face of the blade and a horizontal plane corresponding to a first (or top) or second (or bottom) edge of the channel is from greater than 15 degrees to about 45 degrees.

Aspect 56: The device of any preceding claim, wherein in the second blade position, a bisecting angle formed by the cutting face of the blade and a horizontal plane corresponding to a first (or top) or second (or bottom) edge of the channel is from greater than 0 degrees to about 135 degrees.

Aspect 57: The device of any preceding claim, wherein in the second blade position, a bisecting angle formed by the cutting face of the blade and a horizontal plane corresponding to a first (or top) or second (or bottom) edge of the channel is from greater than 0 degrees to about 90 degrees.

Aspect 58: The device of any preceding claim, wherein in the second blade position, a bisecting angle formed by the cutting face of the blade and a horizontal plane corresponding to a first (or top) or second (or bottom) edge of the channel is from greater than 15 degrees to about 90 degrees.

Aspect 59: The device of any preceding claim, wherein in the second blade position, a bisecting angle formed by the rear face of the blade and a horizontal plane corresponding to a first (or top) or second (or bottom) edge of the channel is from greater than 0 degrees to about 60 degrees.

Aspect 60: The device of any preceding claim, wherein in the second blade position, a bisecting angle formed by the rear face of the blade and a horizontal plane corresponding to a first (or top) or second (or bottom) edge of the channel is from greater than 0 degrees to about 45 degrees.

Aspect 61: The device of any preceding claim, wherein in the first blade position, a bisecting angle formed by the rear face of the blade and a horizontal plane corresponding to a first (or top) or second (or bottom) edge of the channel is from greater than 0 degrees to about 30 degrees.

Aspect 62: The device of any preceding claim, wherein the housing further comprises a wire aperture configured to releasably secure ends of conductors or wires to allow for bending wire loops.

Aspect 63: The device of any preceding claim, wherein the housing further comprises a v-shaped notch configured for twisting wire nuts.

Aspect 64: The device of any preceding claim, wherein the device further comprises a notch (e.g., v-notch) on at least one portion of the device configure to at least one of: strip insulation off underlying conductors and tighten wire nuts.

Aspect 65: The device of any preceding claim, wherein the housing further comprises attachments means configured to releasably connect detachable device components.

Aspect 66: The device of any preceding claim, wherein the attachment means comprise apertures, holes in housing, fittings, clips, hooks, fasteners, and the like.

Aspect 67: The device of any preceding claim, wherein the housing is configured to open in a clam shell construction.

Aspect 68: The device of any preceding claim, wherein the device comprises torsion springs on the right for right-hand users and on the left for left-hand users.

Aspect 69: The device of any preceding claim, wherein the sheathed cable is a non-metallic sheathed cable.

Aspect 70: The device of any preceding claim, wherein the housing has a length from about 2.0 inches to about 24 inches.

Aspect 71: The device of any preceding claim, wherein the housing has a length from about 3.0 inches to about 12 inches.

Aspect 72: The device of any preceding claim, wherein the housing has a length from about 4.0 inches to about 6.2 inches.

Aspect 73: The device of any preceding claim, wherein the housing has a width from about 0.2 inches to about 2.0 inches.

Aspect 74: The device of any preceding claim, wherein the housing has a width from about 0.3 inches to about 1.5 inches.

Aspect 75: The device of any preceding claim, wherein the housing has a width from about 0.4 inches to about 1.0 inches.

Aspect 76: The device of any preceding claim, wherein the housing has a height from about 0.2 inches to about 3.0 inches.

Aspect 77: The device of any preceding claim, wherein the wire channel of the housing has a length from about 2.0 inches to about 24 inches.

Aspect 78: The device of any preceding claim, wherein the wire channel of the housing has a width from about 0.4 inches to about 1.0 inches.

Aspect 79: The device of any preceding claim, wherein the wire channel of the housing has a height from about 0.2 inches to about 3.0 inches.

Aspect 80: The device of any preceding claim, wherein the wire channel of the housing has a height from about 0.3 inches to about 2.0 inches.

Aspect 81: The device of any preceding claim, wherein the housing has a height from about 0.4 inches to about 1.7 inches.

Aspect 82: The device of any preceding claim, wherein the first and/or second aperture has a width from about 0.1 inches to about 1.0 inches.

Aspect 83: The device of any preceding claim, wherein the first and/or second aperture has a width from about 0.2 inches to about 0.7 inches.

Aspect 84: The device of any preceding claim, wherein the first and/or second aperture has a width from about 0.4 inches to about 0.6 inches.

Aspect 85: The device of any preceding claim, wherein the first and/or second aperture has a height from about 0.1 inches to about 1.0 inches.

Aspect 86: The device of any preceding claim, wherein the first and/or second aperture has a height from about 0.15 inches to about 0.5 inches.

Aspect 87: The device of any preceding claim, wherein the first and/or second aperture has a height from about 0.2 inches to about 0.3 inches.

Aspect 88: The device of any preceding claim, further comprising at least one clean out aperture or holes disposed on the top and/or bottom of the housing.

Aspect 89: The device of any preceding claim, further comprising a plurality of clean out apertures or holes disposed on the top and bottom of the housing.

Aspect 90: The device of any preceding claim, wherein the clean out apertures or holes are in fluid communication with the wire channel.

Aspect 91: The device of any preceding aspect, wherein the tension element is configured to flex to allow for blade movement within the blade pocket upon insertion of a cable through the channel from the first aperture.

Aspect 92: The device of any preceding aspect, wherein the tension element is integrated or molded with the housing.

Aspect 93: The device of any preceding claim, wherein the tension element is formed by creating through holes from the exterior of the housing.

Aspect 94: A method for stripping and cutting non-metallic sheathed cable (NMSC) using a cable stripping device, the method comprising: receiving a non-metallic sheathed cable in a wire channel of the stripping device of any preceding claim; sliding the non-metallic sheathed cable along the wire channel in a first travel direction; and cutting and/or removing the sheathing of the non-metallic sheathed cable by pulling the stripping device in an opposing travel direction.

While aspects of the present disclosure can be described and claimed in a particular statutory class, such as the system statutory class, this is for convenience only and one of skill in the art will understand that each aspect of the present disclosure can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way appreciably intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

Throughout this application, various publications can be referenced. The disclosures of these publications in their entireties are hereby incorporated by reference into this application in order to more fully describe the state of the art to which this pertains. The references disclosed are also individually and specifically incorporated by reference herein for the material contained in them that is discussed in the sentence in which the reference is relied upon. Nothing herein is to be construed as an admission that the present disclosure is not entitled to antedate such publication by virtue of prior disclosure. Further, the dates of publication provided herein can be different from the actual publication dates, which can require independent confirmation.

The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

What is claimed:

1. A device for stripping sheathed cable, the device comprising:
    a housing having a first elongate aperture at a first end of the housing, a second elongate aperture at an opposed second end of the housing, and an elongate channel having a generally rectangular cross-section and connecting the first aperture and the second aperture, the channel configured to allow the sheathed cable to travel therethrough;
    at least one blade, wherein the at least one blade is contained in at least one corresponding blade pocket within the housing, the at least one blade having a cutting edge configured to cut or incise at least a portion of a sheath of the sheathed cable, such that the sheath can be removed to expose a plurality of electrical conductors contained therein; and
    at least one tension element, the at least one tension element being in operable communication with the at least one blade, the at least one tension element configured to exert a force effective to maintain the at least one blade in a first blade position wherein a portion of the at least one blade is disposed within the channel;
    wherein the at least one blade is configured to move within the at least one corresponding blade pocket between the first blade position and a second blade position based on a direction of movement of the sheathed cable through the elongate channel, wherein in the second blade position, all or substantially all of the at least one blade is retracted into the at least one corresponding blade pocket.

2. The device of claim 1, wherein the at least one blade comprises a plurality of blades and the at least one corresponding blade pocket comprises a plurality of corresponding blade pockets, and wherein each of the blades are respectfully contained in one of the plurality of corresponding blade pockets, of the plurality of corresponding blade pockets, within the housing.

3. The device of claim 2, wherein each of the blades comprises a front face, a rear face, and a cutting face, and wherein the cutting edge is defined by a shared edge of the rear face and the cutting face.

4. The device of claim 3, wherein an angle formed by the cutting face and rear face of each of the blades is from greater than 15 degrees to about 60 degrees.

5. The device of claim 4, wherein the at least one tension element comprises a plurality of tension elements, and wherein each of the tension elements is in operable communication with a respective one of the plurality of blades to maintain the respective one blade in the first blade position.

6. The device of claim 5, wherein each of the tension elements comprises a molded cantilever arm.

7. The device of claim 5, wherein each of the blade pockets is defined by at least a first pocket wall and a second pocket wall, each of the blade pockets comprising an interior volume, and wherein each of the blades are contained in a respective one of the interior volumes.

8. The device of claim 7, wherein each of the blade pockets includes a slot shaped and dimensioned for inserting the corresponding blade, and wherein each of the blades is held in the respective slot by friction fit between the first pocket wall of the respective blade pocket and a corresponding one of the plurality of tension elements.

9. The device of claim 8, wherein the movement of one of the blades comprises a rotational movement about an axis in a range of from greater than 0 degrees to about 30 degrees.

10. The device of claim 9, wherein in the first blade position, the rear face of one of the blades is configured to be positioned against the first pocket wall, and wherein in the second blade position, the cutting face of the one of the blades is configured to be positioned against the second pocket wall.

11. The device of claim 10, wherein each of the blades is configured to move from the first blade position to the second blade position when a cable is pulled through the channel in a first direction traveling from the first aperture to the second aperture; and wherein each of the blades is configured to move from the second blade position to the first blade position when a cable is traveling through the channel in a second direction from the second aperture to the first aperture.

12. The device of claim 11, wherein in the first blade position, the portion each of the blades disposed within the channel comprises the cutting edge and at least a portion of cutting face; and wherein in the second blade position, all or substantially all of each of the blades is retracted into the blade pocket upon a cable traveling through the channel in the first direction from the first aperture to the second aperture.

13. The device of claim 12, wherein each of the blades is configured to return from the second blade position to the first blade position upon the cable traveling through the channel in the second direction from the second aperture to the first aperture and/or when the channel is unoccupied.

14. The device of claim 13, wherein each of the blades is angled in the corresponding blade pocket using the corresponding tension element to allow for blade movement within the corresponding blade pocket upon insertion of a cable through the channel from the first aperture.

15. The device of claim 14, wherein in the second blade position, a bisecting angle formed by the rear face of each of the blades and a horizontal plane defined by a top or bottom edge of the corresponding channel is from greater than 0 degrees to about 45 degrees; and wherein in the first blade position, a bisecting angle formed by the rear face of each of the blades and the horizontal plane defined by the top or bottom edge of the corresponding channel is from greater than 0 degrees to about 45 degrees.

16. The device of claim 1, further comprising a plurality of clean out holes disposed on a top and bottom of the housing, and in fluid communication with the channel.

17. A method for stripping and cutting non-metallic sheathed cable (NMSC) using the device for stripping a sheathed cable of claim 1, the method comprising:
receiving a non-metallic sheathed cable in the elongate channel of the stripping device;
sliding the non-metallic sheathed cable along the elongate channel in the direction of movement in relation to the stripping device; and
removing the sheathing of the non-metallic sheathed cable by pulling the stripping device so that the non-metallic sheathed cable moves in a second direction opposite to the direction of movement in relation to the stripping device.

18. A device for stripping sheathed cable, the device comprising:
a housing having a first elongate aperture at a first end of the housing, a second elongate aperture at an opposed second end of the housing, and an elongate channel connecting the first aperture and the second aperture, the channel configured to allow the sheathed cable to travel therethrough;
a plurality of blades, each blade contained in a corresponding blade pocket, of a plurality of blade pockets within the housing, each blade comprising a cutting edge configured to cut or incise at least a portion of a sheath of the sheathed cable; and
a plurality of molded spring arms, each of the plurality of molded spring arms in operable communication with a corresponding one of the plurality of blades, each spring arm being configured to exert a force effective to maintain the corresponding one blade in a first blade position, wherein a portion of the corresponding one blade is disposed within the channel;
wherein each blade is configured to move within the blade pocket between the first blade position and a second blade position based on a direction of movement of the sheathed cable through the elongate channel, wherein in the second blade position all or substantially all of each of the plurality of blades is retracted into the corresponding blade pocket.

19. The device of claim 18, wherein each of the plurality of blades comprises at least a front face, a rear face, a cutting face, and a cutting edge defined by a shared edge of the rear face and cutting face.

20. The device of claim 19, wherein each of the plurality of blades, in the first blade position, is configured such that the rear face of the blade is positioned against a first pocket wall of the blade pocket, and wherein each of the plurality of blades, in the second blade position, is configured such that a cutting face of the blade is positioned against a second pocket wall of the blade pocket.

\* \* \* \* \*